US012115773B2

(12) United States Patent
Nishizawa et al.

(10) Patent No.: US 12,115,773 B2
(45) Date of Patent: Oct. 15, 2024

(54) CONVEYING APPARATUS AND PRINTING APPARATUS

(71) Applicant: SEIKO EPSON CORPORATION, Tokyo (JP)

(72) Inventors: Shuhei Nishizawa, Shiojiri (JP); Koji Sato, Shiojiri (JP); Yoshihisa Horikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/174,763

(22) Filed: Feb. 27, 2023

(65) Prior Publication Data

US 2023/0271412 A1 Aug. 31, 2023

(30) Foreign Application Priority Data

Feb. 28, 2022 (JP) ................................ 2022-029424

(51) Int. Cl.
*B41F 35/00* (2006.01)

(52) U.S. Cl.
CPC ...... *B41F 35/001* (2013.01); *B65H 2301/531* (2013.01)

(58) Field of Classification Search
None
See application file for complete search history.

(56) References Cited

U.S. PATENT DOCUMENTS

2015/0309413 A1* 10/2015 Liu .......................... B41F 7/24 355/27
2022/0410560 A1* 12/2022 Praharaj ................. B41F 31/02

FOREIGN PATENT DOCUMENTS

JP 2021-134071 A 9/2021

* cited by examiner

*Primary Examiner* — Joshua D Zimmerman
(74) *Attorney, Agent, or Firm* — WORKMAN NYDEGGER

(57) ABSTRACT

A conveying unit conveys a medium by moving a glue belt. The conveying unit includes a vapor application unit and a cleaning unit. The vapor application unit applies heated vapor to a front surface of the glue belt separated from the medium. The cleaning unit cleans the front surface to which the vapor is applied by the vapor application unit.

13 Claims, 16 Drawing Sheets

CONVEYING APPARATUS AND PRINTING APPARATUS

The present application is based on, and claims priority from JP Application Serial Number 2022-029424, filed Feb. 28, 2022, the disclosure of which is hereby incorporated by reference herein in its entirety.

BACKGROUND

1. Technical Field

The present disclosure relates to a conveying apparatus and a printing apparatus.

2. Related Art

A recording medium conveying apparatus disclosed in JP-A-2021-134071 includes a conveying belt that conveys a recording medium, a cleaning solution application unit that applies a cleaning solution to the conveying belt after the recording medium is peeled off, a removal member that removes the cleaning solution from the conveying belt, and a pressure changing mechanism that changes a pressure for causing the removal member to come into contact with the belt. The cleaning solution application unit is configured of a sprinkling pipe, a pump, and the like.

An example of a method for improving the performance of removing foreign matter on a front surface of a conveying belt in a configuration that applies a cleaning solution to the front surface of the conveying belt that is moving, as in the cleaning solution application unit disclosed in JP-A-2021-134071, includes a method of increasing the pressure of a cleaning solution.

However, when the pressure of the cleaning solution is increased, there is concern that the high-pressure cleaning solution will collide with the conveying belt, and the cleaning solution will be scattered around a recording medium conveying apparatus.

SUMMARY

The conveying apparatus according to the present disclosure for solving the above problems is a conveying apparatus for conveying a medium by moving a conveying belt, the conveying apparatus including:

a vapor application unit configured to apply heated vapor to a front surface of the conveying belt separated from the medium and a cleaning unit configured to clean the front surface to which the vapor is applied by the vapor application unit.

In order to solve the above problems, a printing apparatus according to the present disclosure is a printing apparatus including a conveying apparatus configured to convey a medium by moving a conveying belt and a recording unit configured to perform recording on the moving medium, wherein the conveying apparatus includes a vapor application unit configured to apply heated vapor to a front surface of the conveying belt separated from the medium and a cleaning unit configured to clean the front surface to which the vapor is applied by the vapor application unit.

DESCRIPTION OF EXEMPLARY EMBODIMENT

Figure 1:
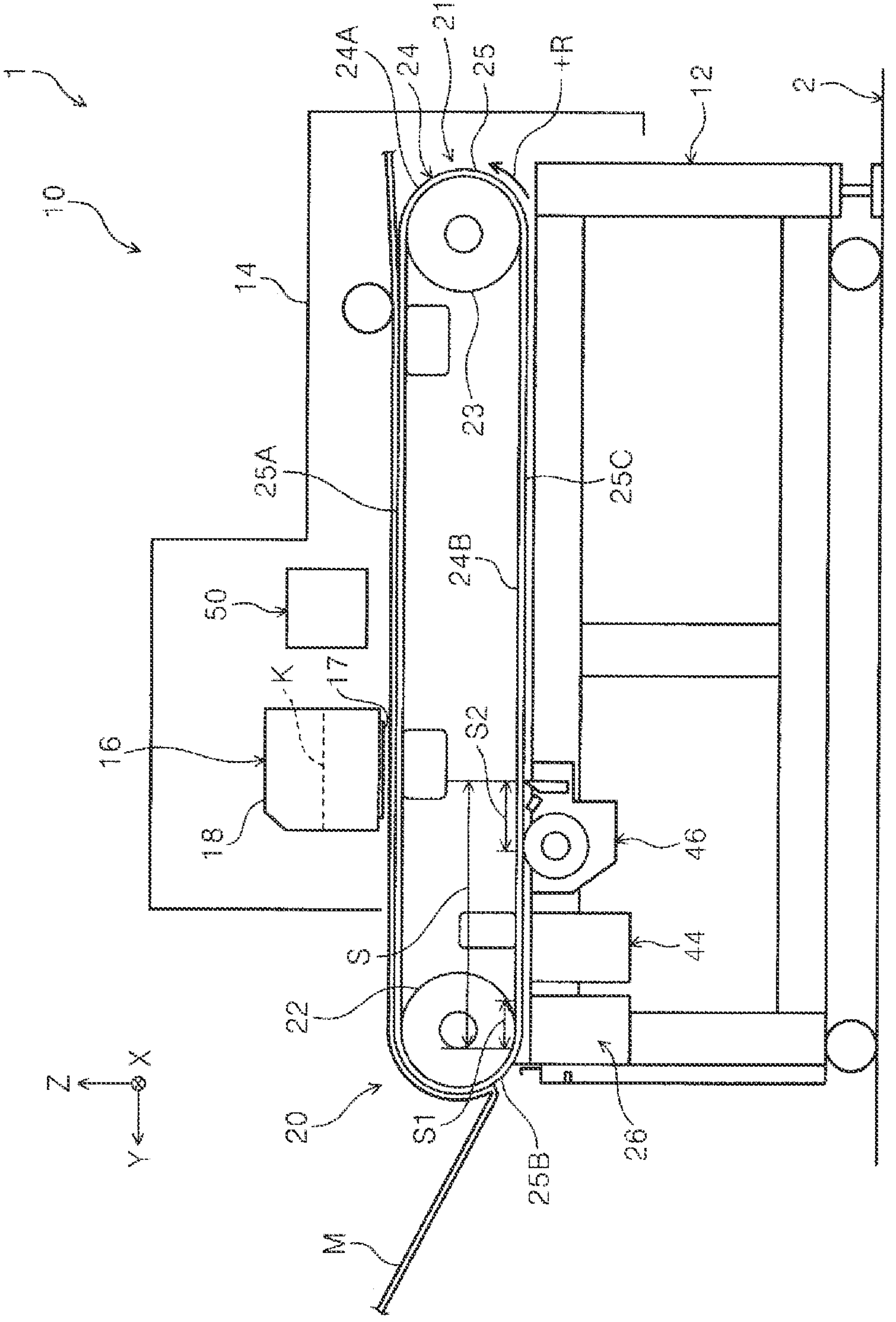
FIG. 1 is a schematic diagram of an internal structure of a printer according to Embodiment 1.

Hereinafter, the present disclosure will be briefly described.

A conveying apparatus according to a first aspect is a conveying apparatus for conveying a medium by moving a conveying belt, characterized in that the conveying apparatus includes: a vapor application unit configured to apply heated vapor to a front surface of the conveying belt separated from the medium; and a cleaning unit configured to clean the front surface to which the vapor is applied by the vapor application unit.

According to this aspect, the foreign matters adhered to the front surface of the glue belt is easily lifted from the front surface by the vapor. That is, since the vapor is used instead of the liquid to remove the foreign matters adhered to the front surface of the conveying belt, it is possible to create a state in which it is easy for the foreign matters to be removed in a state in which scattering of a liquid including the foreign matters to surroundings of the conveying apparatus occurring when a cleaning solution (liquid) is used is suppressed.

The conveying apparatus according to a second aspect is characterized in that, in the first aspect, the conveying apparatus includes a cooling unit configured to cool at least a portion of a target region, the target region being from a first region to which the vapor is applied to a second region cleaned by the cleaning unit on the front surface.

According to this aspect, at least a portion of the target region is cooled by the cooling unit so that part of the moisture in the air and the moisture contained in the vapor is condensed in the target region. Accordingly, since the moisture is supplied to the target region, for example, the foreign matters are covered thereby, and the foreign matters are easily removed, it is possible to enhance the removal performance of the foreign matters.

The conveying apparatus according to a third aspect is characterized in that, in the second aspect, the cooling unit cools the second region.

According to this aspect, it is difficult for dew condensation to occur between the first region and the second region, and dew condensation occurs in the second region. The moisture condensed in the second region is collected by the cleaning unit. This makes it possible to prevent water droplets from dropping from the front surface between the first region and the second region.

The conveying apparatus according to a fourth aspect is characterized in that, in any one of the first to third aspects, the conveying apparatus includes a control unit configured to control an operation of the vapor application unit, wherein the control unit controls the operation of the vapor application unit according to a state of the front surface.

According to this aspect, when the state of the front surface is a state in which a large amount of foreign matters are adhered, the control unit can perform control for increasing at least one of an amount of heated vapor applied by the vapor application unit or an amount of supplied vapor. When a heating amount in the vapor application unit is increased, a temperature of the vapor rises and kinetic energy of the molecules of the vapor increases. A thermal motion of molecules of the substances contained in foreign matters with a low temperature becomes violent due to a violent thermal motion of the molecules of the vapor with a high temperature, and a bonding force between the molecules of the substance contained in the foreign matters is weakened. That is, the foreign matters whose temperature has been increased are softened. Further, when an amount of vapor supplied to the conveying belt is increased, the foreign matters are easily diluted with the vapor. Therefore, it is possible to further enhance the removal performance of the foreign matters.

The conveying apparatus according to a fifth aspect is characterized in that, in any one of the first to third aspects, the conveying apparatus includes a control unit configured to control an operation of the vapor application unit, wherein the control unit controls an operation of the vapor application unit according to a moving speed of the conveying belt.

According to this aspect, when the moving speed of the glue belt increases, the control unit can perform control for increasing at least one of an amount of heated vapor applied by the vapor application unit or an amount of supplied vapor. Accordingly, even when a time during which the vapor is applied to the front surface is shortened, at least one of the vapor at the temperature required for removal of the foreign matters or the vapor in an amount required for removal of the foreign matters can be applied to the front surface, and thus, deterioration of the removal performance of the foreign matters can be suppressed.

The conveying apparatus according to a sixth aspect is characterized in that, in any one of the first to third aspects, the medium is a recording medium on which an image is recorded, the conveying apparatus includes a control unit configured to control an operation of the vapor application unit, and the control unit controls an operation of the vapor application unit according to a duty of the image.

When the duty of the image is high, an amount of used recording material used for recording is high, and thus, an amount of foreign matters adhered to the front surface is likely to be high.

According to this aspect, when a state of the front surface is a state in which a large amount of foreign matters are adhered, the control unit can perform control for increasing at least one of an amount of heated vapor applied by the vapor application unit or an amount of supplied vapor. When the amount of heated vapor in the vapor application unit is increased, foreign matters whose temperature has been increased are softened. Further, when amount of supplied vapor in the vapor application unit is increased, the foreign matters are easily diluted with the vapor. Therefore, it is possible to further enhance the removal performance of the foreign matters.

The conveying apparatus according to a seventh aspect is characterized in that, in any one of the fourth to sixth aspects, the conveying apparatus includes an airflow generation unit configured to generate an airflow toward a back surface opposite to the front surface of the conveying belt, wherein the control unit adjusts an amount of airflow generated by the airflow generation unit according to an amount of vapor generated from the vapor application unit.

According to this aspect, when part of the vapor supplied to the front surface from the vapor application unit is caused to flow to the back surface via the outer side from an end portion of the conveying belt, the airflow generated in the airflow generation unit pushes part of the vapor back to a region on the front surface side.

Here, since control for increasing the amount of generated airflow in the airflow generation unit is possible when an amount of vapor generated from the vapor application unit is large, it is possible to prevent part of the vapor from diffusing to other portions via a region on the back surface side.

The conveying apparatus according to an eighth aspect is characterized in that, in the seventh aspect, the conveying apparatus includes a heating unit configured to heat an arrival region at which the airflow arrives on the back surface, wherein the control unit controls a heating temperature of the heating unit according to the amount of generated airflow.

According to this aspect, even in a configuration in which the dew condensation easily occurs due to an action of temperature reduction due to the airflow, the arrival region is heated by the heating unit such that occurrence of the dew condensation on the back surface can be suppressed.

The conveying apparatus according to a ninth aspect is characterized in that, in any one of the first to eighth aspects, the cleaning unit includes: a scraping member configured to scrape off foreign matters adhered to the front surface while coming into contact with the front surface; and a collection unit configured to collect the foreign matters scraped off by the scraping member, and the scraping member is provided with a guide portion configured to guide the foreign matters to the collection unit.

According to this aspect, the foreign matters scraped off by the scraping member flows down along the guide groove and are collected by the collection unit. Accordingly, since it is difficult for the foreign matters to stay between the scraping member and the front surface, deterioration of the cleaning performance of the cleaning unit can be suppressed.

The conveying apparatus according to a tenth aspect is characterized in that, in the ninth aspect, the cleaning unit includes an air blowing unit configured to blow air toward the collection unit, and at least a portion of the scraping member is blown between the air blowing unit and the collection unit.

According to this aspect, the foreign matters adhered to the scraping member are moved toward the collection unit under the pressure of the air blown by the air blowing unit, and are collected by the collection unit. This makes it possible to prevent the foreign matters adhered to the scraping member from adhering to the front surface again.

A printing apparatus according to an eleventh aspect is a printing apparatus including a conveying apparatus configured to convey a medium by moving a conveying belt, and a recording unit configured to perform recording on the moving medium, wherein the conveying apparatus includes: a vapor application unit configured to apply heated vapor to a front surface of the conveying belt separated from the medium; and a cleaning unit configured to clean the front surface to which the vapor is applied by the vapor application unit.

According to this aspect, it is possible to create a state in which it is easy for the foreign matters to be removed in a state in which scattering of a liquid including the foreign matters is suppressed through the same action as that in the first aspect. That is, it is possible to prevent the inside of the printer from being contaminated by the scattered liquid containing the foreign matters.

Embodiment 1

Hereinafter, a printer 10, which is an example of a printing apparatus according to Embodiment 1 of the present disclosure, will be described in detail.

As illustrated in FIG. 1, the printer 10 is installed on a floor 2 of a factory 1. The printer 10 performs recording on the medium M. Examples of the medium M include a cloth and paper. Further, the medium M is pulled out from the front of the printer 10 as an example. An XYZ coordinate system illustrated in each drawing is an orthogonal coordinate system.

An X direction is an apparatus width direction of the printer 10 and is a horizontal direction. When the printer 10 is viewed from the front, a left direction in the X direction is a +X direction, and a right direction is a −X direction. Further, the X direction corresponds to a width direction of the medium M.

A Y direction is a depth direction of the printer 10 and is a horizontal direction. When the printer 10 is viewed from the front, a forward direction is a +Y direction and a depth direction is a −Y direction.

A Z direction is along a gravitational direction in which gravity acts. An upward direction in the Z direction is a +Z direction, and a downward direction is a −Z direction. The +Z direction is an apparatus height direction of the printer 10.

Figure 2:
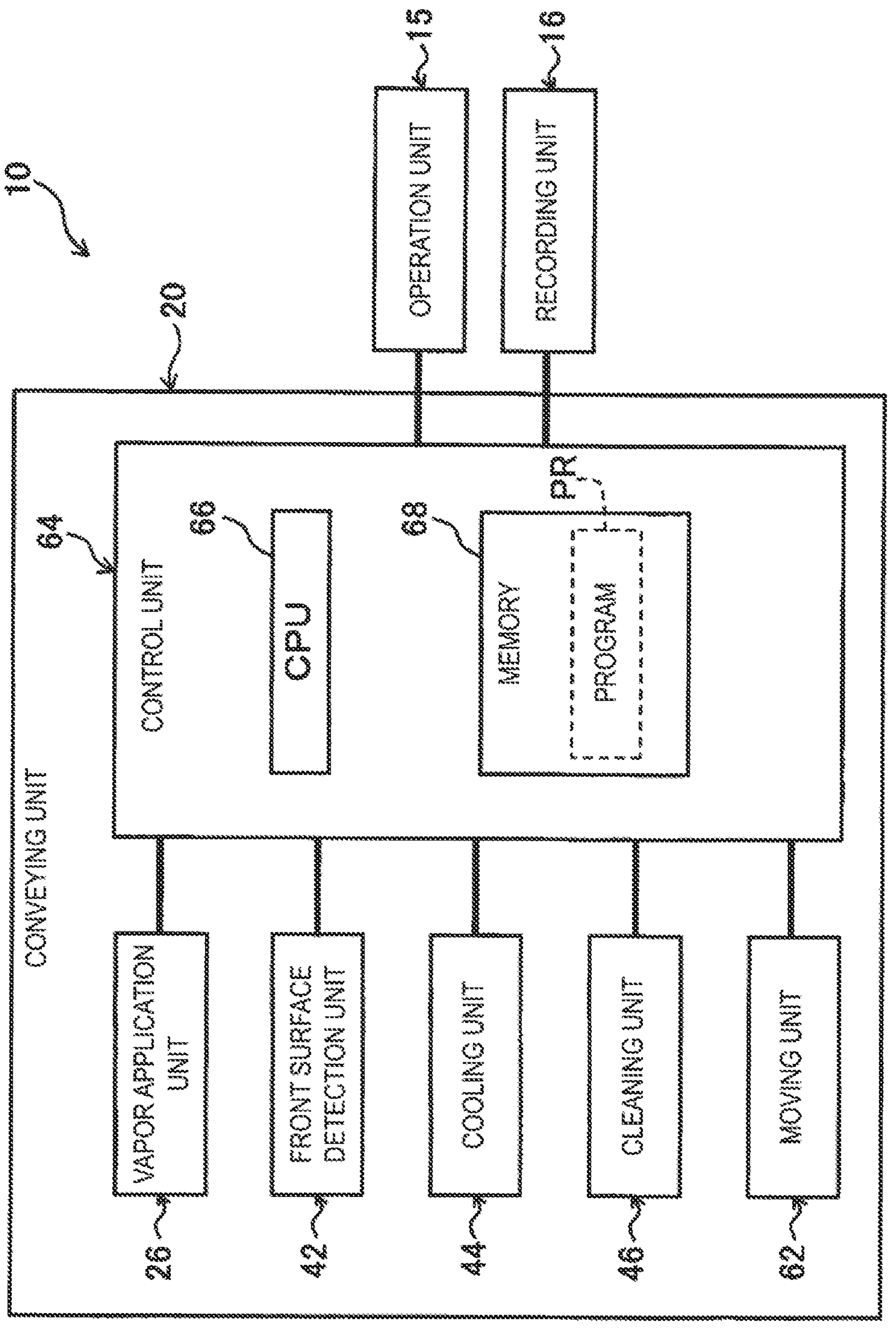
FIG. 2 is a block diagram illustrating respective units of the printer according to Embodiment 1.

The printer 10 includes a recording unit 16 and a conveying unit 20 as an example of a conveying apparatus. Further, the printer 10 includes, as an example, an apparatus body portion 12, a body cover 14, and an operation unit 15 (FIG. 2). As an example, the printer 10 has a recording mode in which recording is performed on the medium M and a maintenance mode for cleaning the printer 10 or replacing parts.

The apparatus body portion 12 is configured as a base portion on which the respective units of the printer 10 are provided.

The body cover 14 is an exterior member that covers the respective units of the printer 10.

The operation unit 15 includes a touch panel and operation buttons (not illustrated). Operations of the respective units of the printer 10 can be set in the operation unit 15.

The recording unit 16 is provided in the apparatus body portion 12. Further, the recording unit 16 performs recording on the medium M moving in the +Y direction. Specifically, the recording unit 16 includes a recording head 17, and a carriage 18 that supports the recording head 17 so that the recording head 17 can reciprocate in the X direction.

The recording head 17 includes a plurality of nozzles (not illustrated) and is disposed in the +Z direction with respect to a glue belt 24 (described below). The recording head 17 can record an image on the medium M by discharging the ink K, which is an example of droplets, onto a recorded surface of the medium M from a plurality of nozzles (not illustrated). In other words, the medium M is a recording medium on which an image is recorded. The ink K is also an example of a recording material.

As illustrated in FIGS. 1 and 2, a conveying unit 20 includes, for example, a belt unit 21, a vapor application unit 26, a front surface detection unit 42, a cooling unit 44, a cleaning unit 46, a moving unit 62, and a control unit 64. The conveying unit 20 is an example of a conveying apparatus that conveys the medium M by moving the glue belt 24, which will be described below. The conveying unit 20 is provided in the apparatus body portion 12.

The control unit 64 functions as, for example, a control unit that controls not only an operation of the conveying unit 20, but also an operation of each unit of the printer 10.

As illustrated in FIG. 1, the belt unit 21 includes, for example, a driving roller 22, a driven roller 23, a glue belt 24, and a motor (not illustrated).

The driving roller 22 is disposed downstream in the +Y direction. The driven roller 23 is disposed upstream in the +Y direction. Both the driving roller 22 and the driven roller 23 includes a rotation shaft in the X direction. Rotation of the driving roller 22 is controlled by the control unit 64 which will be described below.

The glue belt 24 is an example of a conveying belt, and is configured as an endless belt obtained by bonding both ends of an elastic flat plate together. Further, the glue belt 24 is wound around the driving roller 22 and the driven roller 23. In other words, the glue belt 24 is provided in the apparatus body portion 12 and circulated and moved to be able to convey the medium M in the +Y direction. A direction in which the glue belt 24 circulates and moves is defined as a +R direction. An outer peripheral surface of the glue belt 24 is a front surface 24A, and an internal peripheral surface is a back surface 24B. When an entire path along which the glue belt 24 circulates and moves is defined as a circulating path, the circulating path includes a conveying path for adhering and conveying the medium M, and a non-conveying path that is a path other than the conveying path. The medium M is conveyed in the +Y direction on the conveying path. The glue belt 24 moving on the non-conveying path is cleaned by the cleaning unit 46, which will be described below.

As an example, the front surface 24A has adhesiveness by being coated with an adhesive (not illustrated), and can support the medium M and adsorb the medium M. The adhesiveness means a property of the front surface being able to be temporarily adhered to another member and to be peeled off when in an adhered state.

A portion of the front surface 24A located in the +Z direction from a center of the driving roller 22 and being along an XY plane is defined as an upper surface portion 25A. The upper surface portion 25A supports the medium M. Further, a portion of the front surface 24A wound around the driving roller 22 is a curved surface portion 25B. Further, a portion of the front surface 24A located in the −Z direction from the center of the driving roller 22 and being along the XY plane is a lower surface portion 25C.

In the belt unit 21, a winding roller (not illustrated) winds the medium M so that the medium M is peeled off from the curved surface portion 25B.

As an example, the vapor application unit 26 is located at a downstream end portion in the +Y direction among positions facing the lower surface portion 25C in the Z direction. Further, the vapor application unit 26 is located downstream of the curved surface portion 25B in the +R direction. The vapor application unit 26 applies heated vapor VP (FIG. 3) to the front surface 24A of the glue belt 24 separated from the medium M. That is, the vapor application unit 26 applies the vapor VP to at least a portion of the front surface 24A of the glue belt 24 that moves on the non-conveying path. The vapor VP also includes a state in which particles of water W have been lifted into the air.

Figure 3:
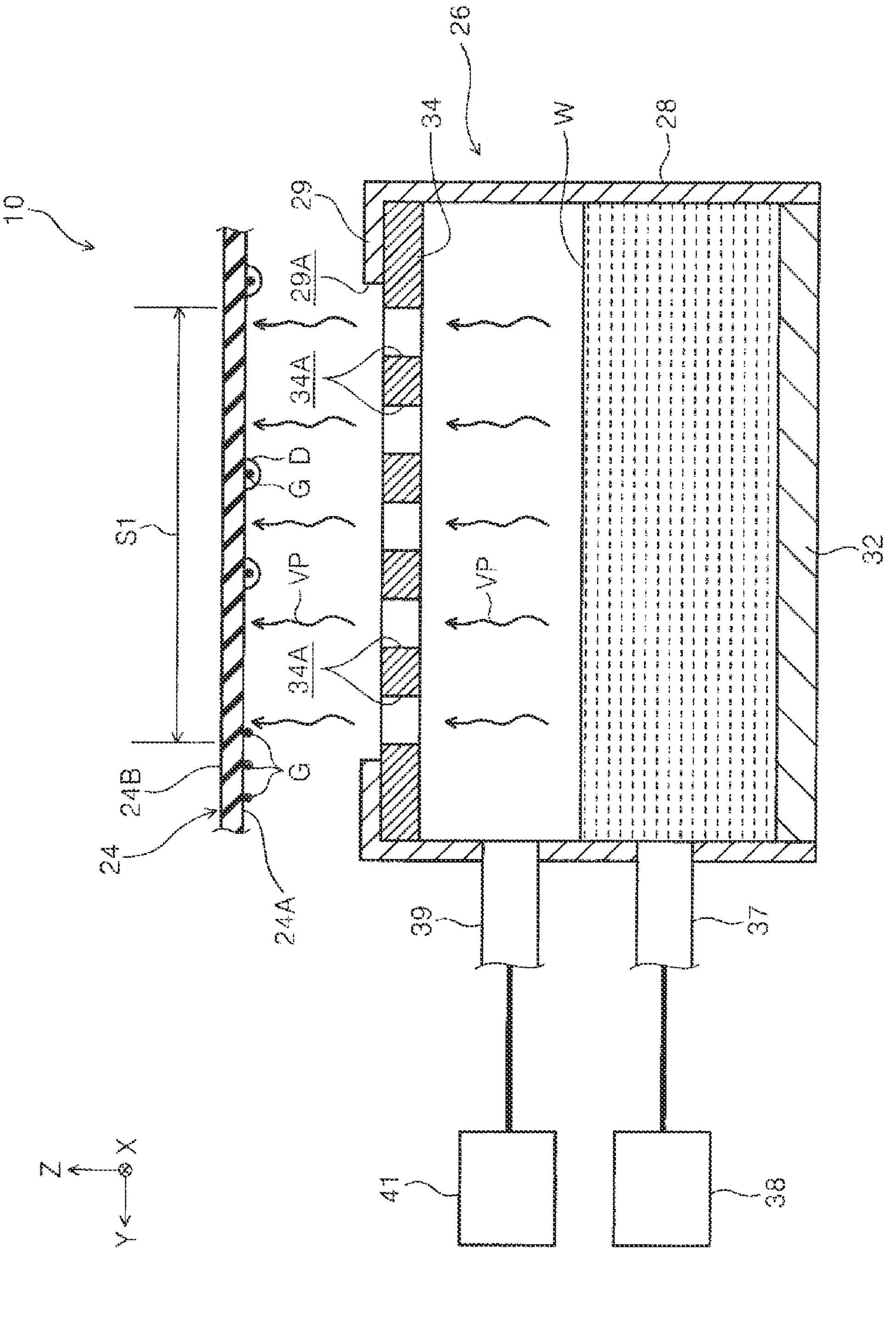
FIG. 3 is a schematic diagram of a vapor application unit and a glue belt according to Embodiment 1.

As illustrated in FIG. 3, the vapor application unit 26 includes, for example, a reservoir 28, a heater 32, a base plate 34 including a plurality of holes 34A formed therein, a supply pipe 37, a supply pump 38, a pressure pipe 39, and a compressor 41.

As an example, the reservoir 28 is configured as a hollow rectangular parallelepiped extending in the X direction. A length in the X direction of the reservoir 28 is larger than a length in the X direction of the glue belt 24. One end portion of the supply pipe 37 and one end portion of the pressure pipe 39 are coupled to a side portion of the reservoir 28. An upper wall 29 in the +Z direction of the reservoir 28 is provided with openings 29A penetrating toward the front surface 24A. The openings 29A are arranged at intervals in the X direction. In other words, in the upper wall 29, regions between the openings 29A adjacent to each other in the X direction are closed.

The heater 32 is provided at a bottom in the −Z direction of the reservoir 28. The heater 32 generates heat when power is supplied from a power supply (not illustrated). Control of the power supply (not illustrated) is performed by the control unit 64 (FIG. 2). In a state in which the water W is stored inside the reservoir 28, the heater 32 generates heat and the vapor VP is generated. The vapor VP is applied to the front surface 24A through the holes 34A, which will be described below, and the openings 29A. Here, the heat generation of the heater 32 may be controlled by the control unit 64 so that the vapor VP at a temperature that does not cause a load on the front surface 24A of the glue belt 24 is applied. Specifically, the heat generation of the heater 32 may be controlled by the control unit 64 so that the temperature of the vapor VP does not exceed 140° C.

The base plate 34 is formed in a plate shape having a predetermined thickness in the Z direction. The base plate 34 is located in the −Z direction with respect to the upper wall 29 inside the reservoir 28. The base plate 34 is provided with a plurality of holes 34A penetrating in the Z direction. A size of the hole 34A is such that the vapor VP can pass through.

Further, in the present embodiment, a shutter member (not illustrated) capable of covering at least a portion of the hole 34A formed in the base plate 34 is provided. As an example, the shutter member is provided slidably in the X direction. A method of sliding the shutter member in the X direction may be either a method of a user manually performing sliding or a method of automatically performing sliding using a motor (not illustrated) or the like. When the shutter member is slid in the X direction, the number and opening area of the holes 34A through which the vapor VP can pass can be changed. In other words, the amount of vapor VP applied to the front surface 24A can be adjusted.

Here, a structure in which, when the user manually slides the shutter member in the X direction, a scale is formed at the base plate 34 in the X direction, and an edge end in the X direction of the shutter member is adjusted to match the scale according to an adhesion situation of foreign matters G on a front surface of the medium M, may be adopted.

The shutter member may be configured to be slid in the Y direction instead of being slid in the X direction so that the amount of vapor VP applied to the front surface 24A can be adjusted.

The other end portion of the supply pipe 37 is coupled to a tank (not illustrated). The water W is stored inside the tank (not illustrated).

The supply pump 38 is coupled to the supply pipe 37. When the supply pump 38 is operated, the water W is supplied to the inside of the reservoir 28 through the supply pipe 37. An operation of the supply pump 38 is controlled by the control unit 64.

The compressor 41 is coupled to the pressure pipe 39.

The compressor 41 compresses air and sends the compressed air into the pressure pipe 39. Thereby, the inside of the reservoir 28 is pressurized. An operation of the compressor 41 is controlled by the control unit 64. That is, it is possible to control the amount of vapor VP applied to the front surface 24A also by controlling a pressurizing force in the compressor 41.

Here, when the printer 10 is viewed from the X direction, a Y-direction region to which the vapor VP is applied on the front surface 24A is a first region S1.

The first region S1 is, for example, a region that faces a portion from the hole 34A located at an end in the +Y direction to the hole 34A located at an end in the −Y direction. In other words, the first region S1 is a region to which vapor VP can be applied.

As illustrated in FIG. 2, the front surface detection unit 42 is configured of, for example, a charge coupled device (CCD) line camera (not illustrated). The front surface detection unit 42 detects a state of the front surface 24A (FIG. 3) after the medium M has been peeled off.

As an example, the front surface detection unit 42 acquires and analyzes image data of the front surface 24A to detect the foreign matters G (FIG. 3) adhered to the front surface 24A, as will be described below. The analysis of the image data may be performed by the control unit 64 or may be performed by another control unit that is provided inside the front surface detection unit 42.

The foreign matters G means an object different from the adhesive applied to the front surface 24A and the front surface 24A, and is, for example, an object including a portion of the medium M, dust, and part of the ink K.

The image data obtained in the front surface detection unit 42 is subjected to each filtering processing such as shade correction, noise removal, and contrast enhancement in the control unit 64. The front surface detection unit 42 detects the presence or absence of the foreign matters G on the front surface 24A based on the image data after filtering processing.

A case in which there are no foreign matters G is not limited to a case in which the number of foreign matters G is zero and includes a case in which the number of foreign matters G per unit area set in advance is smaller than an allowable number.

On the other hand, a case in which there are the foreign matters G means a case in which that the number of foreign matters G per unit area set in advance is equal to or larger than the allowable number.

Further, for the case in which there are the foreign matters G, a plurality of threshold values of the allowable number of the foreign matters G may be set, and a state in which there are the foreign matters G may be distinguished in multiple stages.

As illustrated in FIG. 1, a region cleaned by the cleaning unit 46, which will be described below, is a second region S2 when viewed from the X direction. Further, a region from an end in the +Y direction of the first region S1 to an end in the −Y direction of the second region S2 is a target region S. In other words, the target region S is a region including the first region S1 and the second region S2.

The cooling unit 44 is located in the −Z direction with respect to the front surface 24A. The cooling unit 44 can cool a portion of the target region S when viewed from the X direction. The cooling unit 44 includes, for example, an air cooler and a plurality of nozzles (not illustrated). The air cooler (not illustrated) includes a compressor unit that sends air, a vortex generation unit that generates a vortex using the sent air, and an adjustment valve that adjusts an amount of cool air flowing from the vortex generation unit to the front surface 24A.

Specifically, the cooling unit 44 cools a portion of a region between the first region S1 and the second region S2 in the target region S. In other words, the cooling unit 44 can cool a portion to which the vapor VP is applied in the front surface 24A, which is a portion before being cleaned by the cleaning unit 46. Further, the cooling unit 44 can perform cooling until the vapor VP present around the front surface 24A is condensed.

Figure 4:
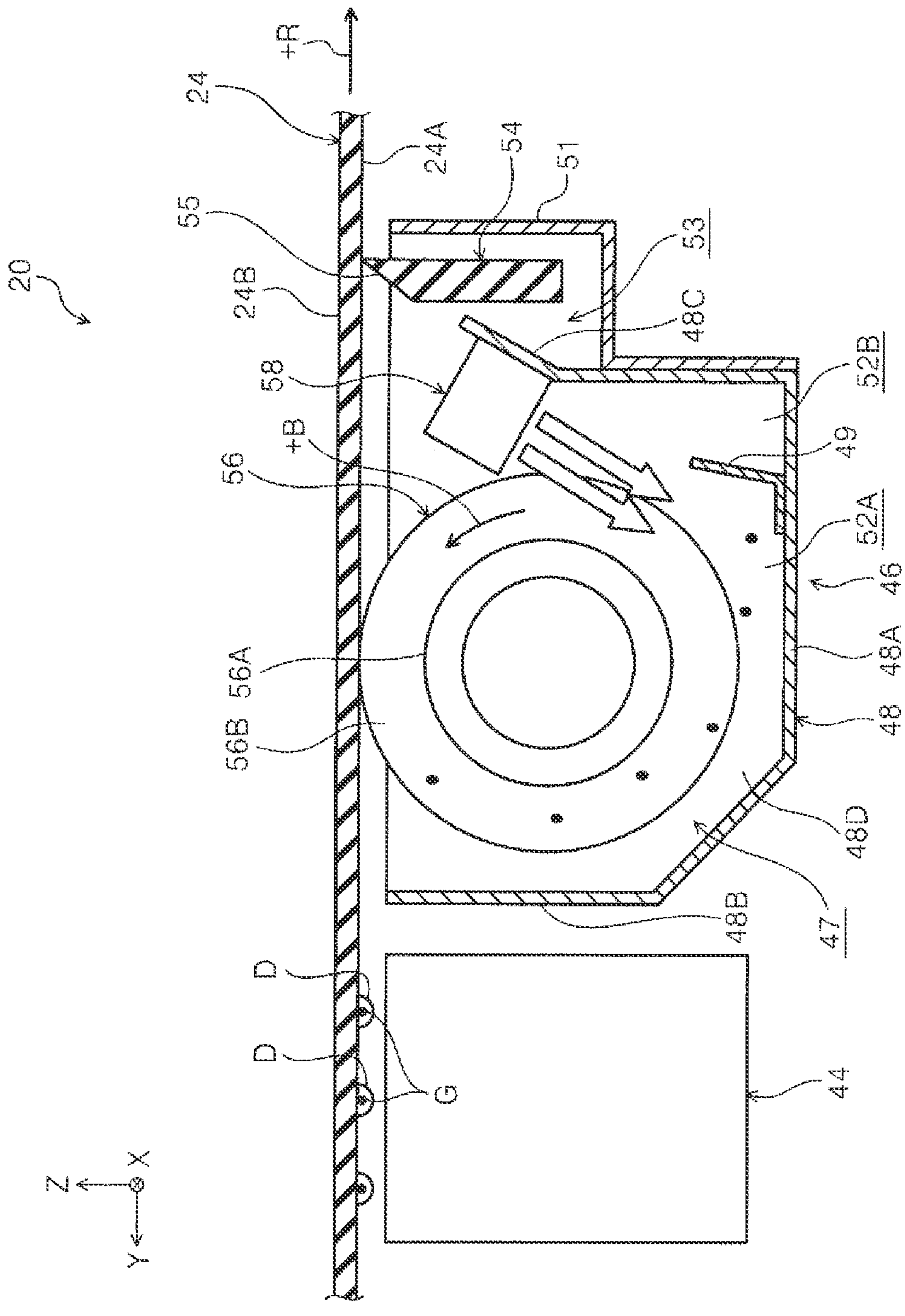
FIG. 4 is a schematic diagram of a cleaning unit according to Embodiment 1.

As illustrated in FIGS. 3 and 4, the cleaning unit 46 cleans the front surface 24A to which the vapor VP is applied by the vapor application unit 26. Specifically, the cleaning unit 46 includes, as an example, a collection tank 48, a partition wall 49, a vertical wall portion 51, a rubber blade 54, a cleaning brush 56, and an air nozzle 58. The cleaning unit 46 is supported by the moving unit 62 (FIG. 2), which is described below, so that the cleaning unit 46 can move in the Z direction.

The collection tank 48 is a box-shaped member that opens in the +Z direction. The collection tank 48 includes a bottom wall 48A, a front wall 48B, a rear wall 48C and side walls 48D.

The bottom wall 48A is along the XY plane and extends in the X direction. The front wall 48B extends in the +Z direction in an end portion in the +Y direction of the bottom wall 48A. The rear wall 48C extends in the +Z direction in an end portion in the −Y direction of the bottom wall 48A. The side walls 48D extend in the +Z direction in both end portions in the X direction of the bottom wall 48A. A chamber 47 is formed by the bottom wall 48A, the front wall 48B, the rear wall 48C, and the side walls 48D. As an example, a cleaning solution is not stored in the chamber 47.

The partition wall 49 is provided on the bottom wall 48A. The partition wall 49 is at a position in the −Y direction and the −Z direction with respect to the cleaning brush 52, which will be described below. The partition wall 49 divides the bottom of the chamber 47 into two space portions 52A and 52B when viewed from the X direction. The space portion 52A is at a position in the +Y direction with respect to the partition wall 49. The space portion 52B is at a position in the −Y direction with respect to the partition wall 49.

The vertical wall portion 51 is provided on the rear wall 48C and is at a position in the −Y direction with respect to the rear wall 48C. A space portion 53 is formed between the rear wall 48C and the vertical wall portion 51.

The rubber blade 54 has both end portions in the X direction supported by brackets (not illustrated), and stands upright in the Z direction in the space portion 53. An end portion in the +Z direction of the rubber blade 54 protrudes in the +Z direction from the vertical wall portion 51 and comes into contact with the front surface 24A. An inclined surface 55 is formed in the end portion in the +Z direction of the rubber blade 54. The inclined surface 55 is a surface inclined so that an end portion in the +Y direction is located in the −Z direction relative to an end portion in the −Y direction. The rubber blade 54 scrapes off moisture or the like remaining on the front surface 24A after cleaning by the cleaning brush 56 from the front surface 24A.

The cleaning brush 56 is a member that cleans the front surface 24A. Specifically, the cleaning brush 56 includes a cylindrical shaft portion 56A, and a brush portion 56B radially extending from an outer peripheral surface other than both end portions in an axial direction of a shaft portion 57. The shaft portion 56A extends in the X direction. Further, the shaft portion 56A is rotatably supported by the collection tank 48 by being rotatably supported by the side wall 48D.

The brush portion 56B comes into contact with the front surface 24A of the lower surface portion 25C in a state in which the cleaning unit 46 is raised in the +Z direction. The cleaning brush 56 can clean water droplets D and the foreign matters G remaining on the front surface 24A by being rotated by a motor (not illustrated). The water droplets D and the foreign matters G removed by the cleaning brush 56 are collected in a portion of the collection tank 48.

The cleaning brush 56 is rotated so that the brush portion 56B moves in a direction opposite to a moving direction of the glue belt 24 at a position of the contact with the lower surface portion 25C. A rotation direction of the cleaning brush 56 is a +B direction.

The air nozzle 58 is attached to the rear wall 48C as an example. The air nozzle 58 injects air sent by a compressor (not illustrated) toward the cleaning brush 56. Specifically, the air nozzle 58 injects air from a portion in the +Z direction of the rear wall 48C toward a position in the +Y direction and the −Z direction. The air injected from the air nozzle 58 is blown to the cleaning brush 56 in a direction substantially tangential to the cleaning brush 56 and in a counter direction with respect to the +B direction of the cleaning brush 56. Accordingly, the foreign matters G or the like adhered to the cleaning brush 56 are removed from the cleaning brush 56. The foreign matters G or the like removed from the cleaning brush 56 are collected by dropping to the bottom of the collection tank 48.

As illustrated in FIG. 2, a lifting operation of the moving unit 62 is controlled by the control unit 64, which will be described below. The moving unit 62 is configured as a lifting platform including a motor and a cam (not illustrated). In the maintenance mode of the printer 10, the moving unit 62 lowers the cleaning unit 46 in the −Z direction with respect to the front surface 24A (FIG. 4). Further, the moving unit 62 raises the cleaning unit 46 in the +Z direction with respect to the front surface 24A in the recording mode of the printer 10. In the maintenance mode, it is possible to maintain a height of the cleaning unit 46 without lowering the cleaning unit 46.

The control unit 64 includes a central processing unit (CPU) 66 that functions as a computer, a memory 68, and a storage (not illustrated). Further, the control unit 64 executes a program PR to control various operations such as conveying, recording, discharging, and cleaning in the respective units of the printer 10.

Various types of data including the program PR that is executed by the CPU 66 are stored in the memory 68. In a portion of the memory 68, it is possible to expand the program PR.

The control unit 64 can control an operation of the vapor application unit 26. Specifically, the control unit 64 can control the operation of the vapor application unit 26 according to the state of the front surface 24A (FIG. 4) detected by the front surface detection unit 42. For example, when the front surface detection unit 42 detects that there are no foreign matters G, the control unit 64 maintains the vapor application unit 26 in a stopped state. The control unit 64 operates the vapor application unit 26 when the front surface detection unit 42 detects that there are the foreign matters G. Specifically, the heater 32 (FIG. 3) is energized to generate heat.

The control unit 64 may perform control for applying a small amount of vapor VP to the front surface 24A when there are no foreign matters G and applying a large amount of vapor VP to the front surface 24A when there are foreign matters G, by operating the vapor application unit 26.

Next, an operation of the printer 10 and the conveying unit 20 will be described with reference to FIGS. 1 to 4. Description of individual figure numbers will be omitted.

The medium M is conveyed by the conveying unit 20. Recording is performed by the recording unit 16 on the conveyed medium M. In this case, when the presence of the foreign matters G is detected by the front surface detection unit 42, the operation of the vapor application unit 26 is controlled by the control unit 64 such that the heater 32 generates heat. The generated vapor VP is applied to the front surface 24A from which the medium M has been peeled off. The amount of water W heated by the heater 32 is adjusted by the control unit 64.

The foreign matters G are covered by the vapor VP on the portion to which the vapor VP is applied in the front surface 24A. The portion to which the vapor VP is applied moves to a position facing the cooling unit 44 as the glue belt 24 moves.

The vapor VP present around the front surface 24A and moisture in the air are cooled by the cooling unit 44. Accordingly, the vapor VP is brought into a dewy state and the foreign matters G are covered with the water droplets D.

The foreign matters G are lifted with respect to the front surface 24A due to an action such as the vapor VP entering a gap between the foreign matters G and the front surface 24A on the front surface 24A, the foreign matters G being covered with the water droplets D generated from the vapor VP, and thermal energy of the vapor VP being applied to the foreign matters G.

As the glue belt 24 moves, the foreign matters G and the water droplets D adhered to the front surface 24A move to a position facing the cleaning unit 36. The foreign matters G and the water droplets D adhered to the front surface 24A are removed from the front surface 24A by the cleaning brush 56 and the rubber blade 54 of the cleaning unit 36. Thus, the front surface 24A is cleaned.

The foreign matters G and the water droplets D adhered to the cleaning brush 56 are removed by air blown from the air nozzle 58 during rotation of the cleaning brush 56. The removed foreign matters G and the water droplets D are collected in the collection tank 48.

As described above, according to the conveying unit 20, the foreign matters G adhered to the front surface 24A of the glue belt 24 are easily lifted from the front surface 24A by the vapor VP. That is, since the vapor VP is used instead of the liquid to remove the foreign matters G adhered to the front surface 24A of the glue belt 24, it is possible to create a state in which it is easy for the foreign matters G to be removed in a state in which scattering of a liquid including the foreign matters G to surroundings of the conveying unit 20 occurring when a cleaning solution (liquid) is used is suppressed. This makes it possible to prevent the surroundings of the conveying unit 20 from being contaminated by the scattered liquid containing the foreign matters G. It is also conceivable that a thermal motion of molecules of the substance contained in the foreign matters G becomes violent due to a thermal motion of molecules of the vapor VP, and a bonding force between the molecules of the substance contained in the foreign matters G is weakened. That is, when the vapor VP is used, it is conceivable that thermal energy also contributes to the improvement of foreign matter removal performance in addition to the pressure. Therefore, even when the same foreign matter removal performance is ensured, a pressure required when the vapor VP is used can be lower than that required when the cleaning solution is used. Therefore, a load acting on the glue belt 24 is smaller when the vapor VP is applied to the front surface 24A by the vapor application unit 26 than when a high-pressure cleaning solution is injected onto the front surface 24A.

Further, as described above, since the thermal energy of the vapor VP applied to the glue belt 24 by the vapor application unit 26 weakens the bonding force between the molecules of substance contained in the foreign matters G, the vapor VP easily enters between the foreign matters G adhered to the front surface 24A and the front surface 24A, and the foreign matters G are easily lifted with respect to the front surface 24A. That is, the foreign matters G are easily removed. Accordingly, since the amount of foreign matters G removed by the cleaning unit 36 increases when the cleaning unit 36 cleans the front surface 24A after the vapor VP is applied, it is possible to enhance removal performance for the foreign matters G.

Thus, according to the conveying unit 20, it is possible to both suppress the load acting on the glue belt 24 and improve the performance of removing the foreign matters G on the front surface 24A of the glue belt 24.

With the conveying unit 20, at least a portion of the target region S is cooled by the cooling unit 44 so that part of the moisture in the air and the moisture contained in the vapor VP is condensed in the target region S. Accordingly, since the moisture is supplied to the target region S, for example, the foreign matters G are covered, and the foreign matters G are easily removed, it is possible to enhance the removal performance of the foreign matters G.

With the conveying unit 20, when the state of the front surface 24A is a state in which a large amount of foreign matters G are adhered, the control unit 64 can perform control for increasing at least one of an amount of heated vapor VP applied by the vapor application unit 26 or a vapor amount of vapor VP. When a heating amount in the vapor application unit 26 is increased, a temperature of the vapor VP rises and kinetic energy of the molecules of the vapor VP increases. A thermal motion of molecules of the substance contained in foreign matters G with a low temperature becomes violent due to a violent thermal motion of the molecules of the vapor VP with a high temperature, and the bonding force between the molecules of the substance contained in the foreign matters G is weakened. That is, the foreign matters G whose temperature has been increased are softened. Further, when an amount of vapor VP supplied to the glue belt 24 is increased, the foreign matters G are easily diluted with the vapor VP. Therefore, it is possible to further enhance the removal performance of the foreign matters G.

According to the printer 10, it is possible to create a state in which it is easy for the foreign matters G to be removed in a state in which scattering of a liquid including the foreign matters G is suppressed through the same action as that of the conveying unit 20. That is, it is possible to prevent the inside of the printer 10 from being contaminated by the scattered liquid containing the foreign matters G.

Embodiment 2

Hereinafter, a conveying unit 70 of Embodiment 2 will be described in detail. The same configurations as those of the printer 10 and the conveying unit 20 of Embodiment 1 are denoted by the same reference signs, and description thereof will be omitted.

Figure 5:
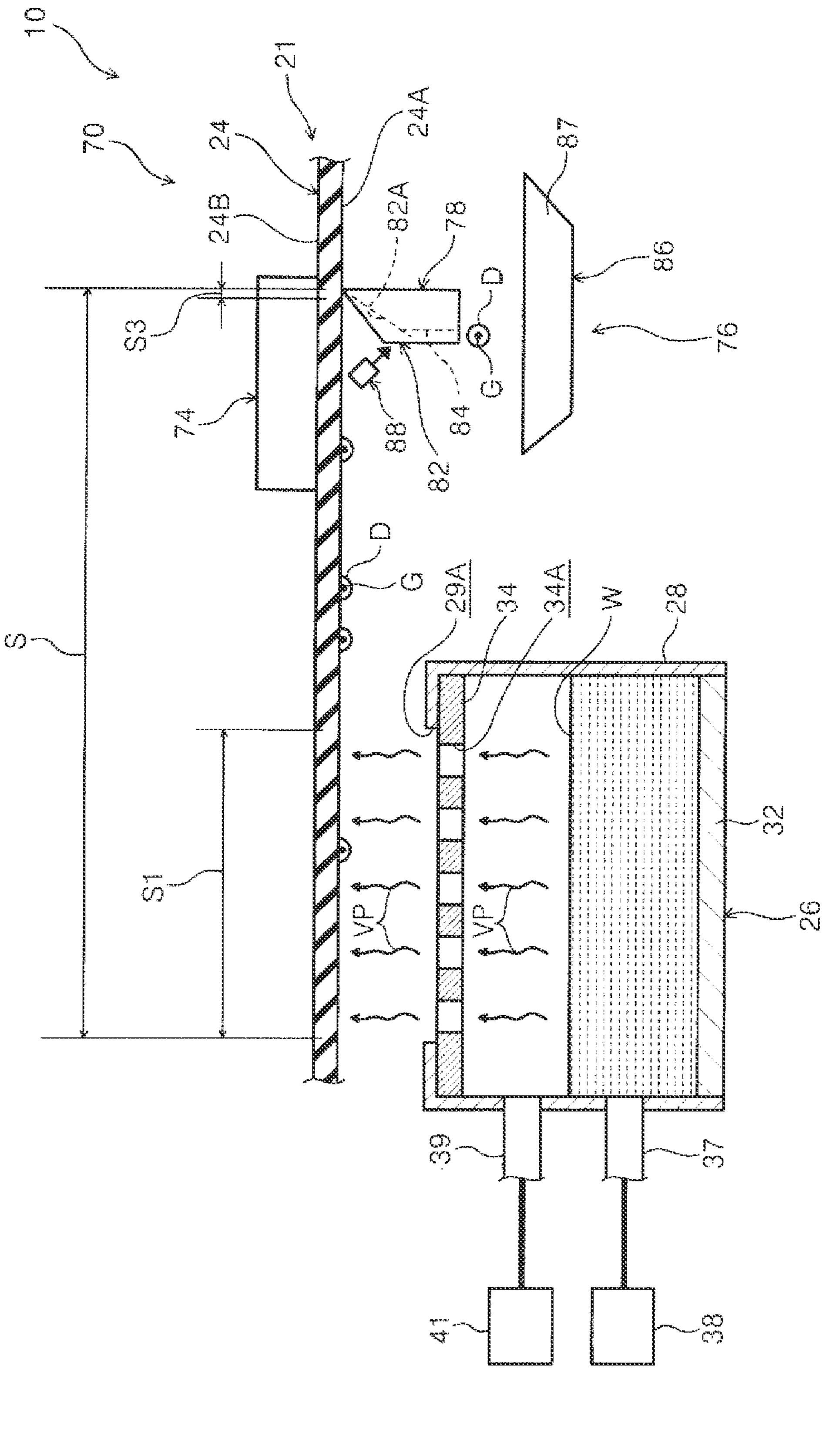
FIG. 5 is a schematic diagram of an internal structure of a printer according to Embodiment 2.

As illustrated in FIG. 5, the conveying unit 70 is provided in the printer 10 in place of the conveying unit 20 (FIG. 1). A configuration of the printer 10 other than the conveying unit 70 is the same as that of Embodiment 1.

The conveying unit 70 includes, for example, a belt unit 21, a vapor application unit 26, the front surface detection unit 42 (FIG. 2), a cooling unit 74, a cleaning unit 76, a moving unit 62, and the control unit 64 (FIG. 2). The conveying unit 70 is an example of a conveying apparatus that conveys the medium M by moving the glue belt 24. The conveying unit 70 is provided in the apparatus body portion 12 (FIG. 1).

The cooling unit 74 is fixed to the apparatus body portion 12 (FIG. 1) on the inner side of the glue belt 24, for example. The cooling unit 74 is brought into contact with the back surface 24B of the glue belt 24 from a position downstream of the vapor application unit 26 in the +R direction to a position aligned in the Z direction with a portion of the cleaning unit 76. The cooling unit 74 includes, for example, a Peltier element and a power supply (not illustrated).

When the Peltier element is energized, a heat absorbing portion of the cooling unit 74 absorbs heat from the back surface 24B of the glue belt 24, and a heat radiating portion thereof radiates heat. Thereby, the glue belt 24 and a space around the glue belt 24 are cooled. As an example, the cooling unit 74 can cool a second region S3, which will be described below, and a partial region between the first region S1 and the second region S3 in the target region S.

A region cleaned by the cleaning unit 76 as viewed in the X direction is the second region S3.

The cleaning unit 76 includes, for example, a scraping member 78, a collection unit 86, and an air blowing unit 88.

The scraping member 78 scrapes the foreign matters G and the water droplets D adhered to the front surface 24A from the front surface 24A. The collection unit 86 collects the foreign matters G scraped off by the scraping member 78.

The air blowing unit 88 blows air toward the scraping member 78 and the collection unit 86.

Figure 6:
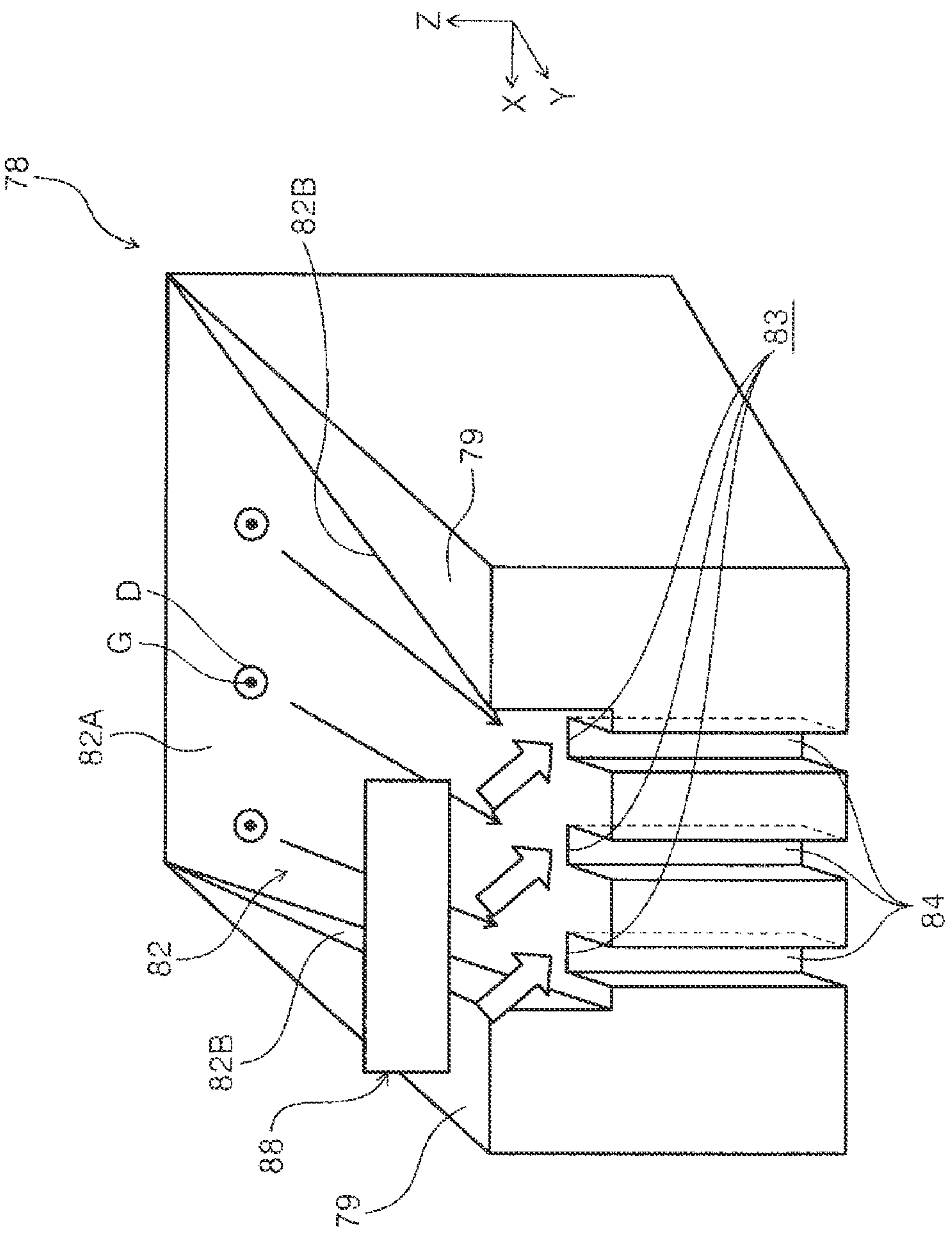
FIG. 6 is a schematic diagram of a cleaning unit according to Embodiment 2.

As illustrated in FIG. 6, the scraping member 78 is, for example, a member having a shape obtained by obliquely cutting an end portion in the +Z direction of a rectangular parallelepiped extending in the Z direction. The scraping member 78 includes an inclined surface 79. The inclined surface 79 extends from an end portion in the −Y direction and an end portion in the +Z direction of the scraping member 78 to a position in the +Y direction and the −Z direction.

The scraping member 78 is provided with an aggregation portion 82 recessed in the −Z direction from the inclined surface 79, and a guide groove 84 extending in the −Z direction from the aggregation portion 82.

The aggregation portion 82 includes a bottom surface 82A and two side surfaces 82B.

The bottom surface 82A is an inclined surface extending from the end portion in the −Y direction and the end portion in the +Z direction of the scraping member 78 to the position in the +Y direction and the −Z direction. A size of an inclination angle of the bottom surface 82A with respect to the XY plane is greater than an inclination angle of the inclined surface 79 with respect to the XY plane. The bottom surface 82A may be configured as a curved surface.

An outer shape of the bottom surface 82A is a trapezoid with an upper base located in the +Y direction and a lower base located in the −Z direction when viewed in the −Z direction. In other words, a width in the X direction in the end portion in the +Y direction of the bottom surface 82A is smaller than a width in the X direction in an end portion in the −Y direction of the bottom surface 82A.

An opening 83 open in the Z direction is formed in the end portion in the +Y direction of the bottom surface 82A.

The two side surfaces 82B stand upright in the +Z direction from both ends in the X direction of the bottom surface 82A. The two side surfaces 82B are located on the oblique sides of the trapezoid of the bottom surface 82A when viewed in the −Z direction. A height in the +Z direction of the two side surfaces 82B increases in the +Y direction.

Thus, a shape of the aggregation portion 82 is a shape including a slope that descends in the −Z direction toward the +Y direction, and a shape in which a depth in the Z direction increases toward the +Y direction. Further, a +Y direction end portion of the aggregation portion 82 is released in the +Y direction.

The guide groove 84 extends in the −Z direction from the opening 83. The guide groove 84 penetrates from the opening 83 to a lower end of the scraping member 78 in the −Z direction. The guide groove 84 is also open in the +Y direction. A plurality of guide grooves 84 are provided at intervals in the X direction. The guide groove 84 has a size allowing the foreign matters G and the water droplets D to pass through. The plurality of guide grooves 84 are examples of guide portions that guide the foreign matters G to the collection unit 86 (FIG. 5), which will be described below.

As illustrated in FIG. 5, the collection unit 86 includes, for example, a tray 87 that opens in the +Z direction.

The tray 87 is located in the −Z direction with respect to the scraping member 78. The tray 87 has a size allowing the scraping member 78 to be covered when viewed in the +Z direction. Accordingly, the foreign matters G and the water droplets D that have flowed in the −Z direction along the side surface in the +Y direction of the scraping member 78 or the guide groove 84 from the bottom surface 82A drop from the scraping member 78 and are collected in the tray 87.

The air blowing unit 88 is provided at a position in the −Z direction with respect to the lower surface portion 25C in the apparatus body portion 12 (FIG. 1). The air blowing unit 88 includes an air nozzle, and a compressor (not illustrated). The air blowing unit 88 blows the air sent by the compressor toward the scraping member 78. Specifically, the air blowing unit 88 blows air toward the plurality of guide grooves 84. In other words, at least a portion of the scraping member 78 is configured to blow air between the air blowing unit 88 and the collection unit 86.

An operation of the conveying unit 70 of Embodiment 2 will be described. Description of the same configuration and operation as those of the conveying unit 20 (FIG. 1) will be omitted.

As illustrated in FIG. 5, the portion to which the vapor VP is applied is moved to a position facing the cooling unit 74 as the glue belt 24 is moved. Some of the foreign matters G has already been covered with the water droplets D due to an action of the vapor VP. The vapor VP present around the front surface 24A and the moisture in the air are cooled by the cooling unit 74. Accordingly, the vapor VP is brought into a dewy state and the foreign matters G are covered with the water droplets D.

The foreign matters G covered with the water droplets D and the foreign matters G not covered with the water droplets D are removed from the front surface 24A by being scraped off by the scraping member 78. The scraped foreign matters G and water droplets D flow down in the +Y direction and the −Z direction along the bottom surface 82A due to an action of their own weight. In this case, since the foreign matters G and the water droplets D are guided by the aggregation portion 82, the foreign matters G and the water droplets D do not flow outward in the X direction from the scraping member 78. The foreign matters G and the water droplets D flow down along the guide groove 84 due to the action of their own weight and an action of the pressure of the blowing air received from the air blowing unit 88, and are collected by the collection unit 86.

As described above, according to the conveying unit 70, it is difficult for the dew condensation to occur between the first region S1 and the second region S3, and the dew condensation occurs in the second region S3. The moisture condensed in the second region S3 is collected by the cleaning unit 76. This makes it possible to prevent the water droplets D from dropping from the front surface 24A between the first region S1 and the second region S3. Further, curing of the adhesive is accelerated, and durability of the adhesive is improved when the glue belt 24 is scraped off by the scraping member 78. This action is also effective at least when the glue belt 24 is scraped off by the cleaning brush 56 in Embodiment 1. That is, when a configuration in which the cleaning unit comes into contact with the front surface 24A of the glue belt 24 is included, the front surface 24A of the glue belt 24 can be cleaned in a state in which the durability of the adhesive is improved.

With the conveying unit 70, the foreign matters G scraped off by the scraping member 78 flow down along the guide groove 84 and are collected by the collection unit 86. Accordingly, since it is difficult for the foreign matters G to stay between the scraping member 78 and the front surface 24A, deterioration of the cleaning performance of the cleaning unit 76 can be suppressed.

With the conveying unit 70, the foreign matters G adhered to the scraping member 78 are moved toward the collection unit 86 under the pressure of the air blown by the air blowing unit 88, and are collected by the collection unit 86. This makes it possible to prevent the foreign matters G adhered to the scraping member 78 from adhering to the front surface 24A again.

Modification Example of Embodiment 2

Figure 7:
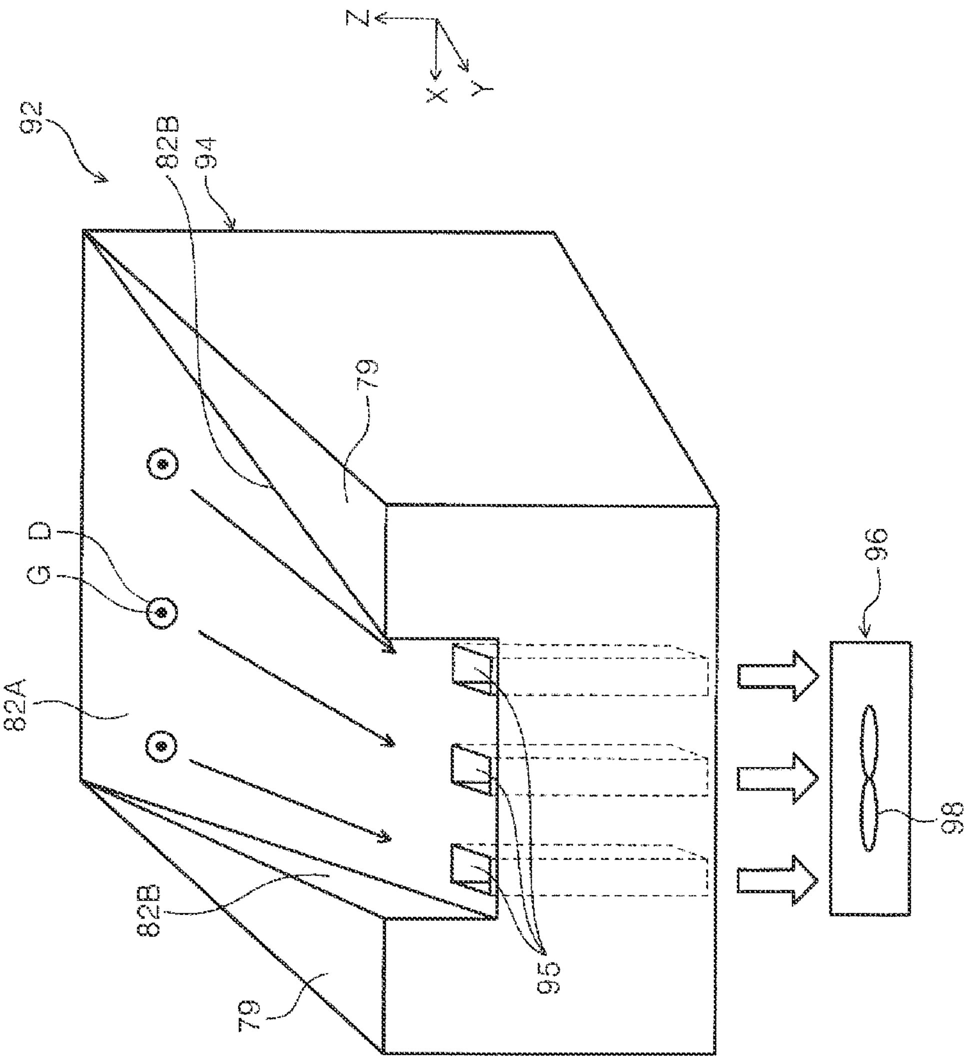
FIG. 7 is a schematic diagram of a cleaning unit according to a modification example of Embodiment 2.

As illustrated in FIG. 7, a cleaning unit 92 is a modification example of the cleaning unit 76 (FIG. 6) of Embodiment 2. The same configurations as those of the cleaning unit 76 are denoted by the same reference signs, and description of figure numbers will be omitted.

The cleaning unit 92 includes, for example, a scraping member 94, a collection unit 86, and a suction unit 96.

The scraping member 94 has a configuration in which a plurality of guide paths 95 are formed by a +Y direction end portion of the guide groove 84 being closed in the scraping member 78. A shape of the guide path 95 is a square cylindrical shape extending in the Z direction. Both end portions in the Z direction of the guide path 95 are open.

The suction unit 96 includes a fan 98, and a motor (not illustrated) that rotates the fan 98. The suction unit 96 uses negative pressure generated inside the guide path 95 due to the rotation of the fan 98 to suck the foreign matters G, the water droplets D, and the like from the guide path 95 toward the collection unit 86. Thus, the foreign matters G and the water droplets D in the guide path 95 may be forcibly moved to the collection unit 86 by suction instead of air blowing.

Embodiment 3

Hereinafter, a conveying unit 100 of Embodiment 3 will be described in detail. The same configurations as those of the printer 10 and the conveying units 20 and 70 of Embodiments 1 and 2 are denoted by the same reference signs, and description thereof will be omitted.

Figure 8:
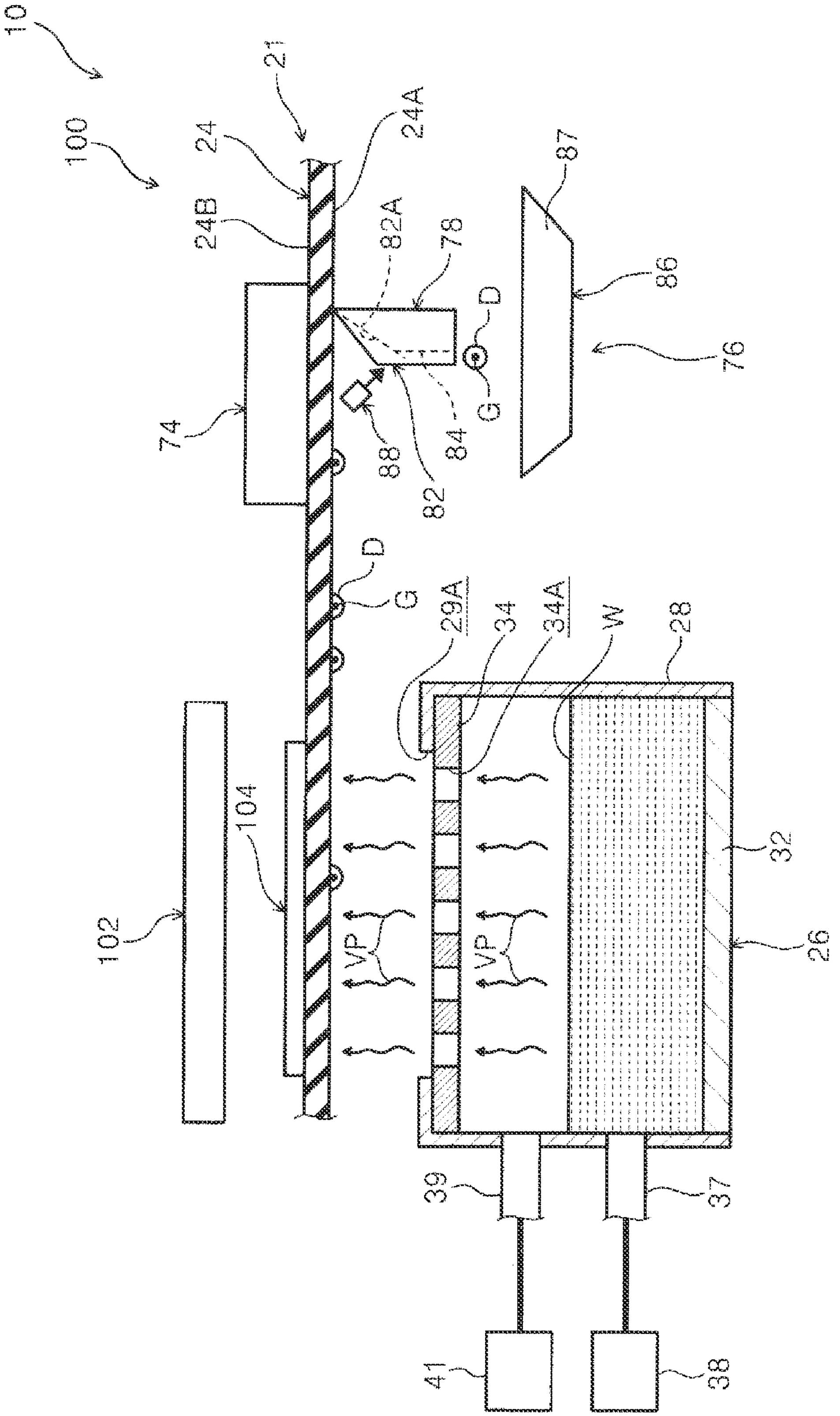
FIG. 8 is a schematic diagram of an internal structure of a printer according to Embodiment 3.
Figure 9:
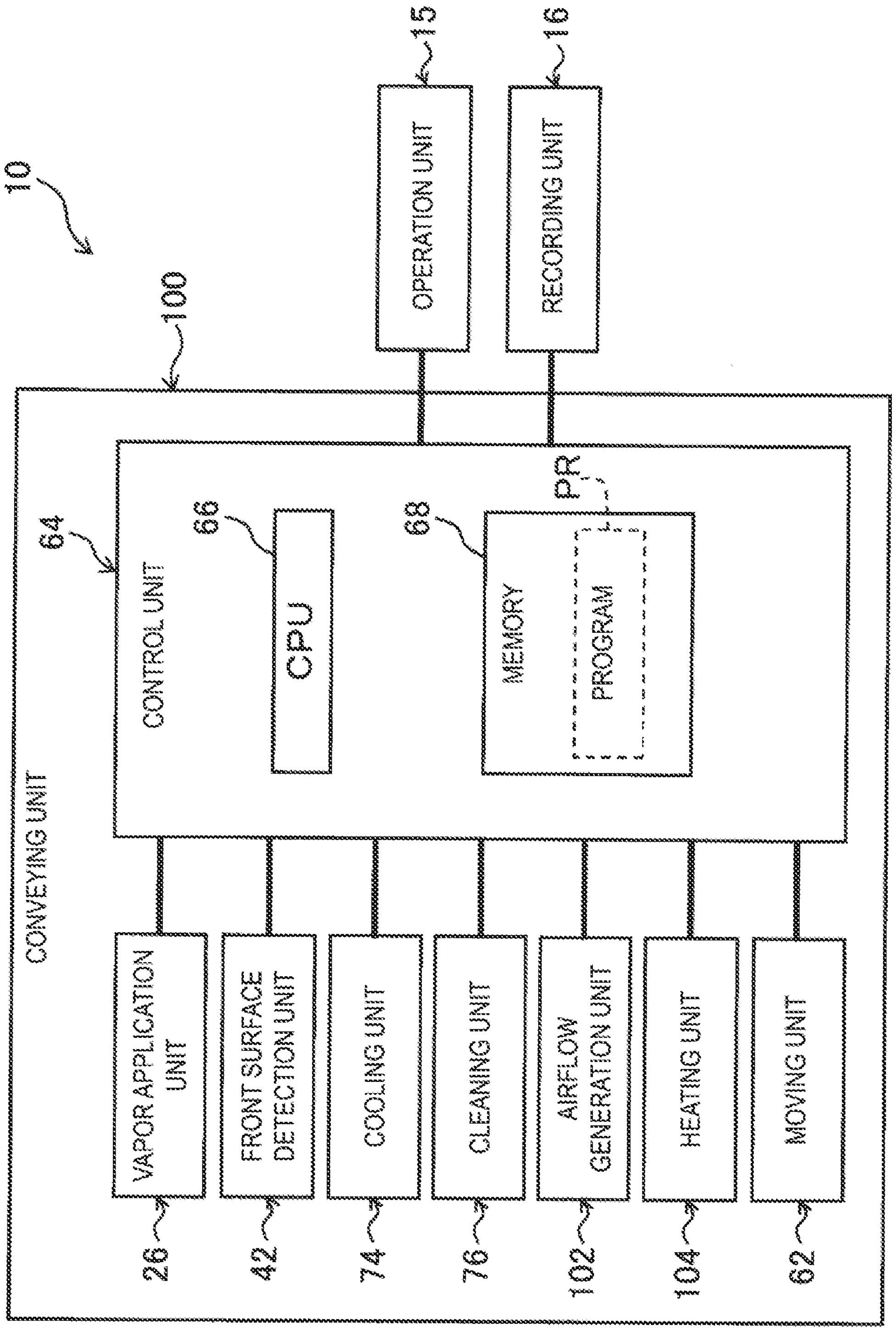
FIG. 9 is a block diagram illustrating respective units of the printer according to Embodiment 3.

As illustrated in FIGS. 8 and 9, the conveying unit 100 is provided in the printer 10 in place of the conveying unit 70 (FIG. 5). A configuration of the printer 10 other than the conveying unit 70 is the same as that of Embodiments 1 and 2.

The conveying unit 100 includes, for example, a belt unit 21, a vapor application unit 26, the front surface detection unit 42 (FIG. 9), a cooling unit 74, a cleaning unit 76, the moving unit 62 and the control unit 64 (FIG. 9), an airflow generation unit 102, and a heating unit 104. The conveying unit 100 is an example of a conveying apparatus that conveys the medium M by moving a glue belt 24. The conveying unit 100 is provided in the apparatus body portion 12 (FIG. 1).

The front surface detection unit 42 of Embodiment 3 is configured to be able to detect an amount of water droplets D adhered to the front surface 24A through image analysis. An amount of water droplets D obtained in the front surface detection unit 42 is not an actual amount, but is an assumed amount allowing a relative comparison when the state of the front surface 24A is different.

The amount of water droplets D obtained in the front surface detection unit 42 is associated with an amount of vapor VP supplied to the glue belt 24 by the vapor application unit 26 in the control unit 64. As an example, when the amount of water droplets D obtained in the front surface detection unit 42 is relatively large, this means that an amount of supplied vapor VP is large. Further, when the amount of water droplets D obtained in the front surface detection unit 42 is relatively small, this means that the amount of supplied vapor VP is small.

The classification for associating the amount of water droplets D with the amount of supplied vapor VP is not limited to the two-stage classification as described above, and division into three or more stages may be made.

As illustrated in FIG. 8, the airflow generation unit 102 is at a position opposite to the vapor application unit 26 with respect to the glue belt 24 in the Z direction. The airflow generation unit 102 is configured to be able to generate an airflow toward the back surface 24B opposite to the front surface 24A of the glue belt 24.

Specifically, the airflow generation unit 102 includes, for example, a plurality of nozzles (not illustrated) arranged in the X direction and the Y direction, and a fan (not illustrated) that blows air to the plurality of nozzles. The plurality of nozzles open toward the back surface 24B. Thus, the airflow generation unit 102 can generate the airflow F (FIG. 10) over the entire back surface 24B in the X direction.

The heating unit 104 is at a position opposite to the vapor application unit 26 with respect to the glue belt 24 in the Z direction. The heating unit 104 comes into contact with the back surface 24B. In other words, the heating unit 104 is located between the glue belt 24 and the airflow generation unit 102 in the Z direction.

Specifically, the heating unit 104 is configured as a plate-shaped heater having a predetermined thickness in the Z direction and extending in the X direction. The heating unit 104 is configured to be able to heat an arrival region E (FIG. 10) at which the airflow F arrives on the back surface 24B.

As illustrated in FIG. 9, the control unit 64 of Embodiment 3 adjusts an amount of generated airflow F in the airflow generation unit 102 according to an amount of vapor VP generated from the vapor application unit 26. Further, the control unit 64 controls a heating temperature of the heating unit 104 according to the amount of generated airflow F.

Specifically, the control unit 64 predicts an amount of generated vapor VP based on an assumed amount of water droplets D obtained in the front surface detection unit 42. The control unit 64 adjusts the amount of generated airflow F according to the amount of generated vapor VP. For example, when the amount of generated vapor VP is large, the amount of generated airflow F is increased. On the other hand, when the amount of generated vapor VP is small, the amount of generated airflow F is decreased.

Further, for example, when the amount of generated airflow F is large, the control unit 64 causes the heating unit 104 to perform heating. On the other hand, when the amount of generated airflow F is small, the heating by the heating unit 104 is stopped.

Thus, the control unit 64 of Embodiment 3 is configured to be able to control the airflow generation unit 102 and the heating unit 104 based on detection information from the front surface detection unit 42.

An operation of the conveying unit 100 of Embodiment 3 will be described. Description of the same configuration and operation as those of the conveying units 20 and 70 described above will be omitted.

Figure 10:
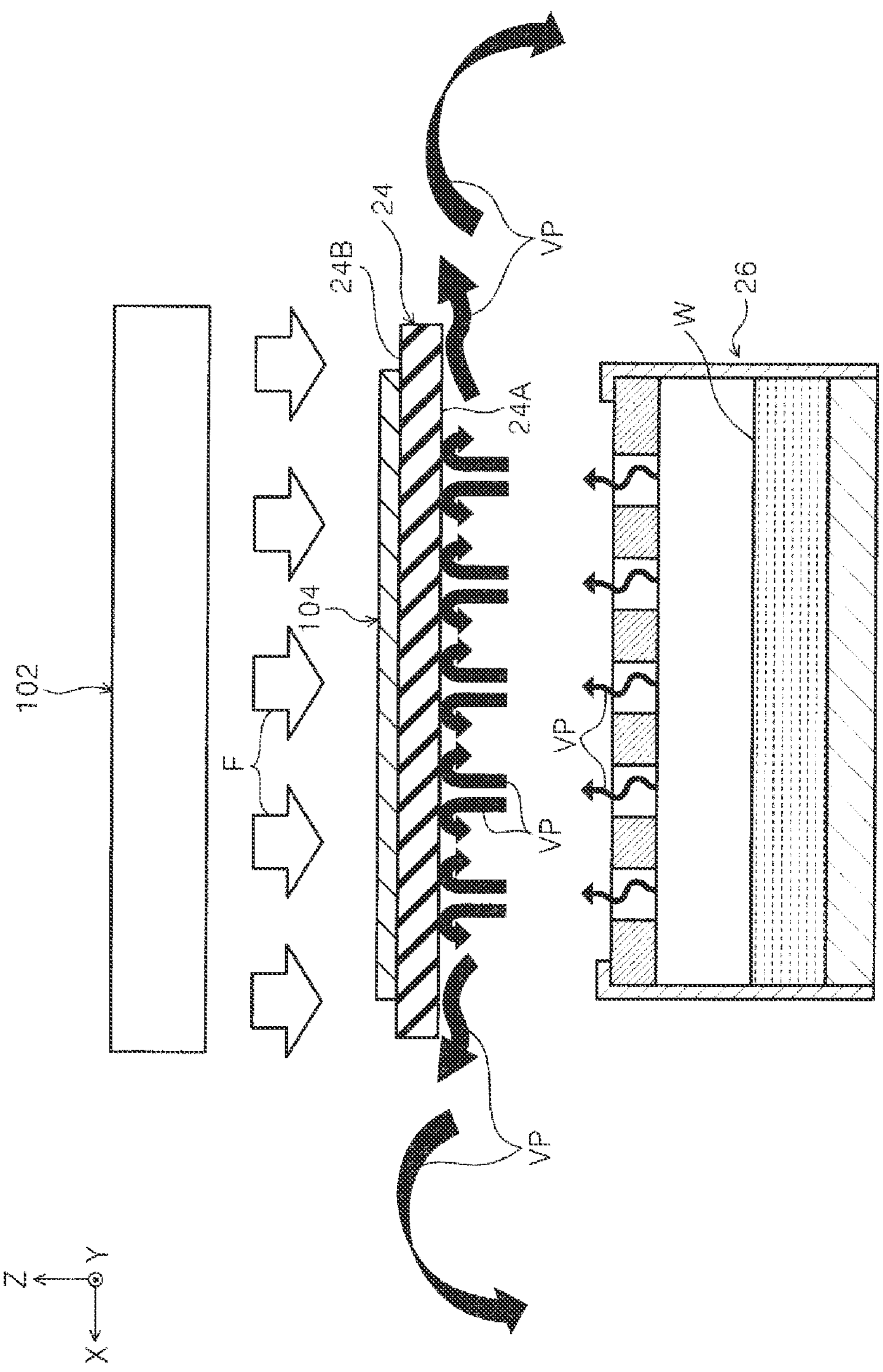
FIG. 10 is a schematic diagram illustrating a flow of vapor in the printer according to Embodiment 3.

As illustrated in FIGS. 9 and 10, the portion to which the vapor VP is applied in the front surface 24A is detected by the front surface detection unit 42. The amount of supplied vapor VP is assumed in the control unit 64.

For example, when the amount of generated vapor VP is large, the control unit 64 increases the amount of generated airflow F in the airflow generation unit 102. Accordingly, the airflow F flowing in the −Z direction suppresses the rise of the vapor VP flowing in the +Z direction. That is, diffusion of vapor VP is suppressed.

Further, when the amount of generated airflow F is large, the control unit 64 causes the heating unit 104 to perform heating. Accordingly, since part of the vapor VP whose temperature has been lowered by the airflow F reaches a temperature at which the dew condensation is difficult to occur, the dew condensation on the back surface 24B is suppressed.

As described above, with the conveying unit 100, when part of the vapor VP supplied to the front surface 24A from the vapor application unit 26 is caused to flow to the back surface 24B via the outer side from an end portion of the glue belt 24, the airflow F generated in the airflow generation unit 102 pushes part of the vapor VP back to a region on the front surface 24A side. Here, since control for increasing the amount of generated airflow F in the airflow generation unit 102 is possible when an amount of vapor VP generated from the vapor application unit 26 is large, it is possible to prevent part of the vapor VP from diffusing to other portions via a region on the back surface 24B side.

With the conveying unit 100, even in a configuration in which the dew condensation easily occurs due to an action of temperature reduction due to the airflow F, the arrival region E is heated by the heating unit 104 such that occurrence of the dew condensation on the back surface 24B can be suppressed.

Embodiment 4

Hereinafter, a conveying unit 110 of Embodiment 4 will be described in detail. The same configurations as those of the printer 10 and the conveying units 20, 70, and 100 of Embodiments 1, 2, and 3 are denoted by the same reference signs, and description thereof will be omitted.

Figure 11:
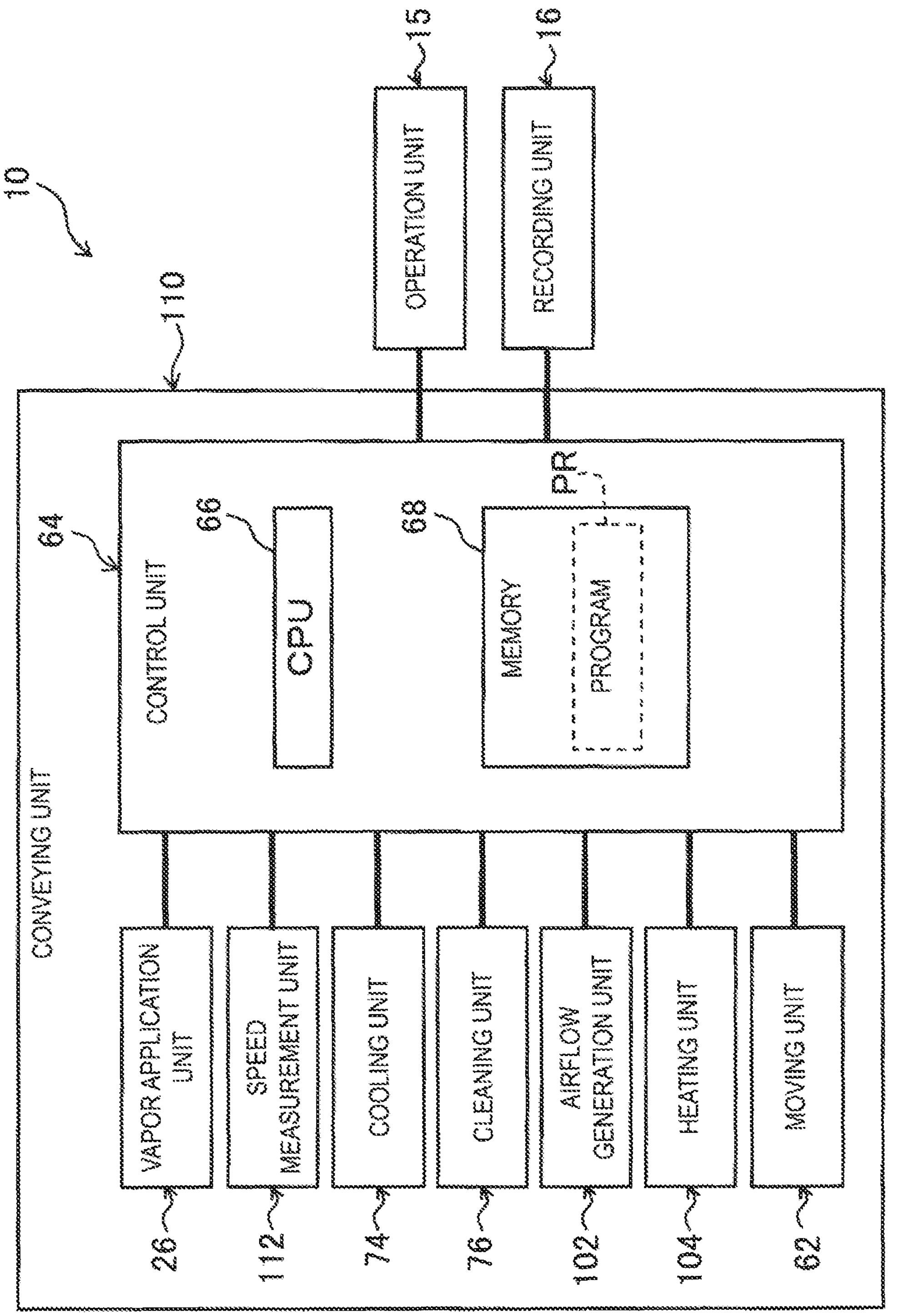
FIG. 11 is a block diagram illustrating respective units of a printer according to Embodiment 4.

As illustrated in FIG. 11, the conveying unit 110 is provided in the printer 10 in place of the conveying unit 100 (FIG. 9). A configuration other than the conveying unit 100 in the printer 10 is the same as that of Embodiments 1, 2, and 3.

The conveying unit 110 includes, for example, the belt unit 21 (FIG. 8), a vapor application unit 26, a speed measurement unit 112, a cooling unit 74, a cleaning unit 76, a moving unit 62, a control unit 64, an airflow generation unit 102, and a heating unit 104. The conveying unit 110 is an example of a conveying apparatus that conveys the medium M by moving the glue belt 24 (FIG. 8). The conveying unit 110 is provided in the apparatus body portion 12 (FIG. 1).

The speed measurement unit 112 includes, for example, an encoder (not illustrated) that detects an amount of movement of the glue belt 24. The encoder may be, for example, a rotary encoder that optically or magnetically detects an amount of rotation of the driven roller 23 (FIG. 1). Further, the speed measurement unit 112 can measure an average speed, which is an amount of belt movement per unit time, as a moving speed of the glue belt 24.

The control unit 64 controls an operation of the vapor application unit 26 according to the moving speed of the glue belt 24 obtained in the speed measurement unit 112.

Specifically, the control unit 64 is configured to cause the heater 32 to generate heat so that a heating temperature of the water W by the heater 32 (FIG. 8) becomes a normal set temperature T1, when the moving speed of the glue belt 24 is a set speed V1 [m/s]. Accordingly, the vapor VP reaches a predetermined temperature. Further, the control unit 64 is configured to cause a shutter member (not illustrated) to slide in the X direction so that the number of holes 34A (or an opening area) through which the vapor VP can pass becomes a normal set number n1 (or a set area S1), when the moving speed of the glue belt 24 is the set speed V1 [m/s]. Accordingly, a predetermined amount of vapor VP is obtained.

Further, the control unit 64 is configured to cause the heater 32 to generate heat so that the heating temperature of the water W by the heater 32 becomes a temperature T2 [K] higher than the normal set temperature T1, when the moving speed of the glue belt 24 is higher than the set speed V1. Accordingly, the vapor VP having a temperature higher than the predetermined temperature is obtained. Further, the control unit 64 is configured to cause the shutter member (not illustrated) to slide in the X direction so that the number of holes 34A (or the opening area) through which the vapor VP can pass reaches the number n2 (or a larger area S2) larger than the normal set number n1 (or the set area S1), when the moving speed of the glue belt 24 is higher than the set speed V1. Accordingly, an amount of vapor VP larger than the predetermined amount is obtained.

The set speed V1, the set temperatures T1 and T2, and the set numbers n1 and n2 (set areas S1 and S2) are not illustrated.

An operation of the conveying unit 110 of Embodiment 4 will be described. Description of the same configuration and operation as those of the conveying units 20, 70, and 100 described above will be omitted.

With the conveying unit 110, when the moving speed of the glue belt 24 exceeds the set speed V1, the control unit 64 can perform control for increasing at least one of an amount of heated vapor VP applied by the vapor application unit 26 or an amount of supplied vapor VP. Accordingly, even when a time during which the vapor VP is applied to the front surface 24A is shortened, at least one of the vapor VP at the temperature required for removal of the foreign matters G or the vapor VP in an amount required for removal of the foreign matters G can be applied to the front surface 24A, and thus, deterioration of the removal performance of the foreign matters G can be suppressed.

Embodiment 5

Hereinafter, a conveying unit 116 of Embodiment 5 will be described in detail. The same configurations as those of the printer 10 and the conveying units 20, 70, 100, and 110 of Embodiments 1, 2, 3, and 4 are denoted by the same reference signs, and description thereof will be omitted.

Figure 12:
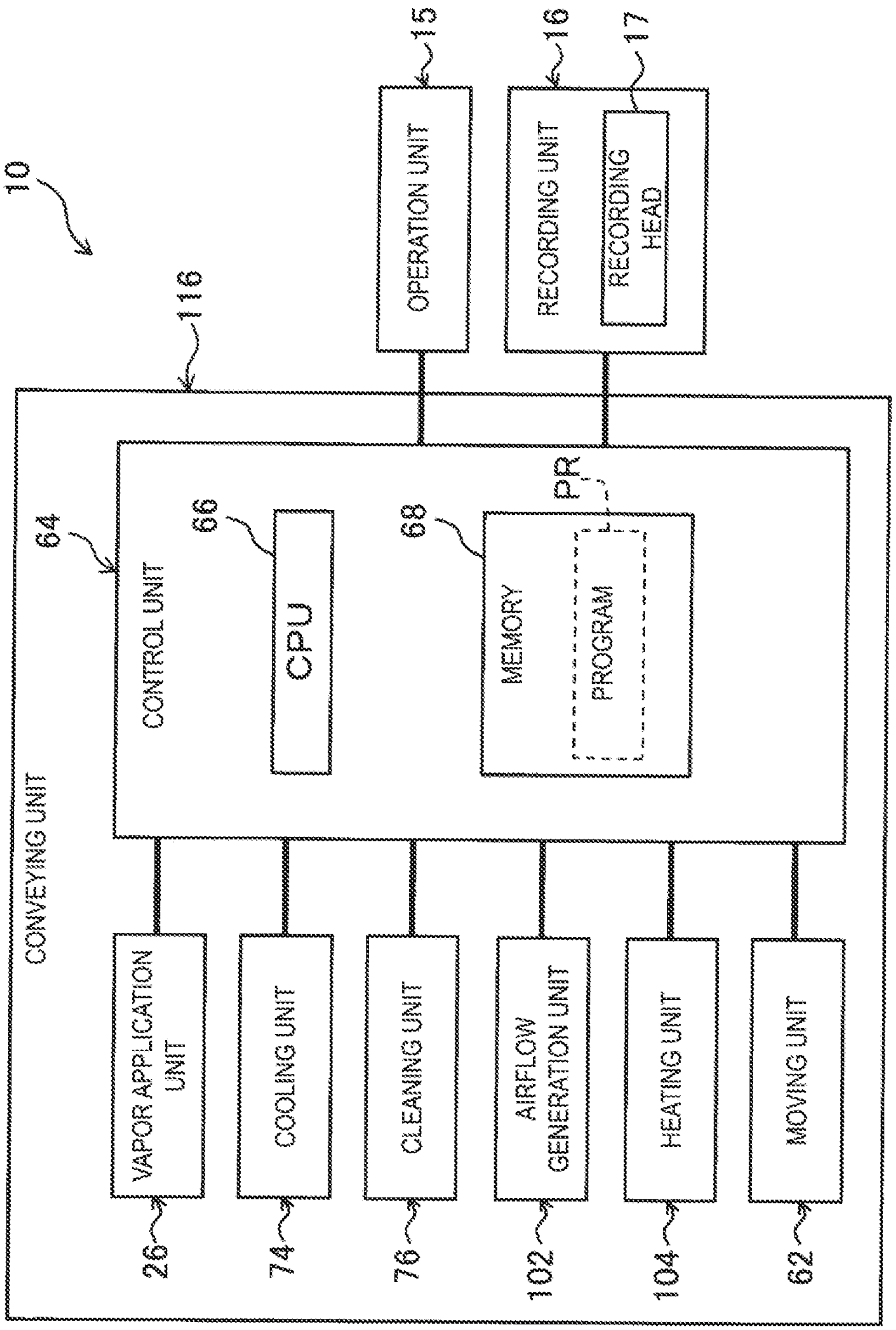
FIG. 12 is a block diagram illustrating respective units of a printer according to Embodiment 5.

As illustrated in FIG. 12, the conveying unit 116 is provided in the printer 10 in place of the conveying unit 100 (FIG. 9). A configuration other than the conveying unit 100 in the printer 10 is the same as that of Embodiments 1, 2, 3, and 4.

The conveying unit 116 includes, for example, the belt unit 21 (FIG. 8), a vapor application unit 26, a cooling unit 74, a cleaning unit 76, a moving unit 62, a control unit 64, an airflow generation unit 102, and a heating unit 104. The conveying unit 116 is an example of a conveying apparatus that conveys the medium M by moving the glue belt 24 (FIG. 8). The conveying unit 116 is provided in the apparatus body portion 12 (FIG. 1).

The control unit 64 controls an operation of the vapor application unit 26 according to a duty of the image recorded on the medium M.

The duty is a value that indicates an average discharge amount indicating a discharge amount per unit area when the recording unit 16 discharges the ink K onto the medium M, with a maximum value being 100%. A value of the duty is acquired by the control unit 64 analyzing recording data used for recording on the medium M.

Specifically, the control unit 64 is configured to cause the heater 32 to generate heat so that the heating temperature of the water W by the heater 32 (FIG. 8) reaches the temperature T2 [K] higher than a normal set temperature T1 [K] when the duty in recording on the medium M is greater than a preset threshold value. Accordingly, the vapor VP having a temperature higher than the predetermined temperature is obtained. Further, the control unit 64 is configured to cause the shutter member (not illustrated) to slide in the X direction so that the number of holes 34A (or the opening area) through which the vapor VP can pass reaches the number n2 (or the larger area S2) larger than the normal set number n1 (or the set area S1), when the duty in recording on the medium M is larger than the preset threshold value. Accordingly, the amount of vapor VP larger than the predetermined amount is obtained. Further, the control unit 64 is configured to cause the heater 32 generate heat so that the heating temperature of the water W by the heater 32 reaches a temperature TO [K] lower than the normal set temperature T1 [K], when the duty in recording on the medium M is smaller than the preset threshold value. Accordingly, the vapor VP having a temperature lower than the predetermined temperature is obtained. Further, the control unit 64 is configured to cause the shutter member (not illustrated) to slide in the X direction so that the number of holes 34A (or the opening area) through which the vapor VP can pass reaches the number n0 (or a smaller area S0) smaller than the normal set number n1 (or the set area S1), when the duty in recording on the medium M is smaller than the preset threshold value. Accordingly, an amount of vapor VP smaller than the predetermined amount is obtained.

The set temperature T1, the temperatures T2 and TO, the set number n1, and the numbers n2 and n0 (the set areas S1 and the areas S2 and S0) are not illustrated.

An operation of the conveying unit 116 of Embodiment 5 will be described. Description of the same configurations and operations as those of the conveying units 20, 70, 100, and 110 described above will be omitted.

When the duty of the image is high, an amount of used ink K used for recording increases, and thus, the amount of foreign matters G adhered to the front surface 24A is likely to increase.

With the conveying unit 116, when the state of the front surface 24A is a state in which a large amount of foreign matters G are adhered, the control unit 64 can perform control for increasing at least one of an amount of heated vapor VP applied by the vapor application unit 26 or an amount of supplied vapor VP. When the amount of heated vapor VP in the vapor application unit 26 is increased, the foreign matters G whose temperature has been increased are softened. Further, amount of supplied vapor VP in the vapor application unit 26 is increased, so that the foreign matters G are easily diluted with the vapor VP. Therefore, it is possible to further enhance the removal performance of the foreign matters G.

Further, even when a time during which the vapor VP is applied to the front surface 24A is shortened, at least one of the vapor VP at the temperature required for removal of the foreign matters G or the vapor VP in an amount required for removal of the foreign matters G can be applied to the front surface 24A, and thus, deterioration of the removal performance of the foreign matters G can be suppressed.

OTHER MODIFICATION EXAMPLES

Although the conveying units 20, 70, 100, 110, and 120 and the printer 10 according to Embodiments 1, 2, 3, 4, and 5 of the present disclosure are basically configured as described above, it is obvious that change, omission, combination, and the like of partial configurations can be made without departing from the gist of the present disclosure. Hereinafter, other modification examples will be described. The same configurations are denoted by the same reference signs, and description thereof will be omitted.

Another Modification Example 1

Figure 13:
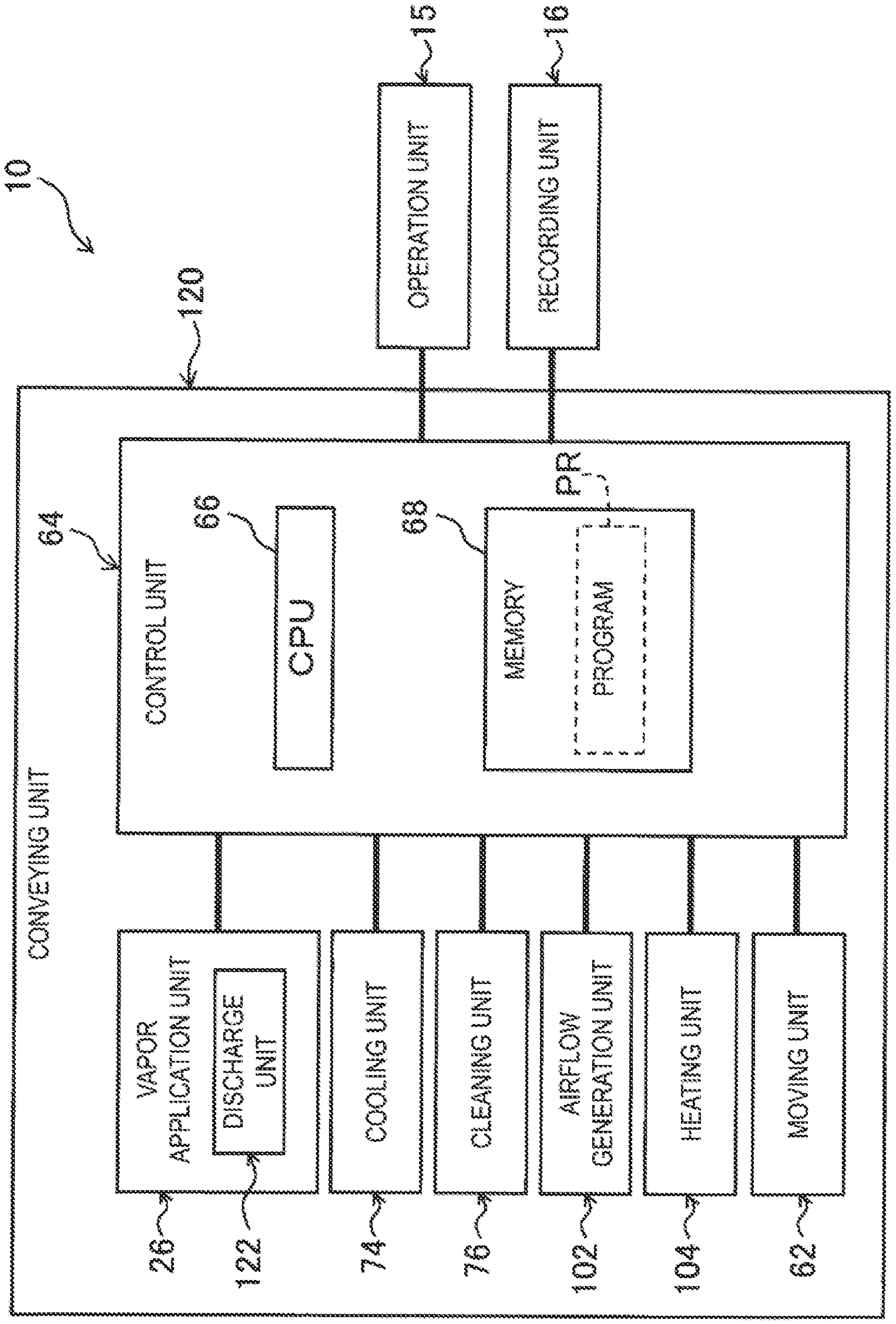
FIG. 13 is a block diagram illustrating respective units of a printer according to another modification example 1.

As illustrated in FIG. 13, a conveying unit 120 is provided in the printer 10 in place of the conveying unit 100 (FIG. 9). A configuration other than the conveying unit 100 in the printer 10 is the same as that of Embodiments 1, 2, 3, 4, and 5.

The conveying unit 120 includes, for example, the belt unit 21 (FIG. 8), a vapor application unit 26, a cooling unit 74, a cleaning unit 76, a moving unit 62, a control unit 64, an airflow generation unit 102, and a heating unit 104. The conveying unit 120 is an example of a conveying apparatus that conveys the medium M by moving the glue belt 24 (FIG. 8). The conveying unit 120 is provided in the apparatus body portion 12 (FIG. 1).

The conveying unit 120 may have a configuration in which a discharge unit 122 is provided in place of the base plate 34 (FIG. 3) in the vapor application unit 26 (FIG. 2).

The discharge unit 122 may be provided in the vapor application unit 26 to discharge the vapor VP. As an example, the discharge unit 122 may be configured of a plurality of nozzles (not illustrated). The plurality of nozzles may be able to adjust a flow rate. That is, a discharge amount of vapor VP discharged from the discharge unit 122 may be adjustable.

For example, the discharge amount of vapor VP discharged from the discharge unit 122 may be adjustable according to the detection information in the front surface detection unit 42 (FIG. 2), the moving speed of the glue belt 24 obtained in the speed measurement unit 112 (FIG. 11), and the duty of the image recorded on the medium M.

Another Modification Example 2

Figure 14:
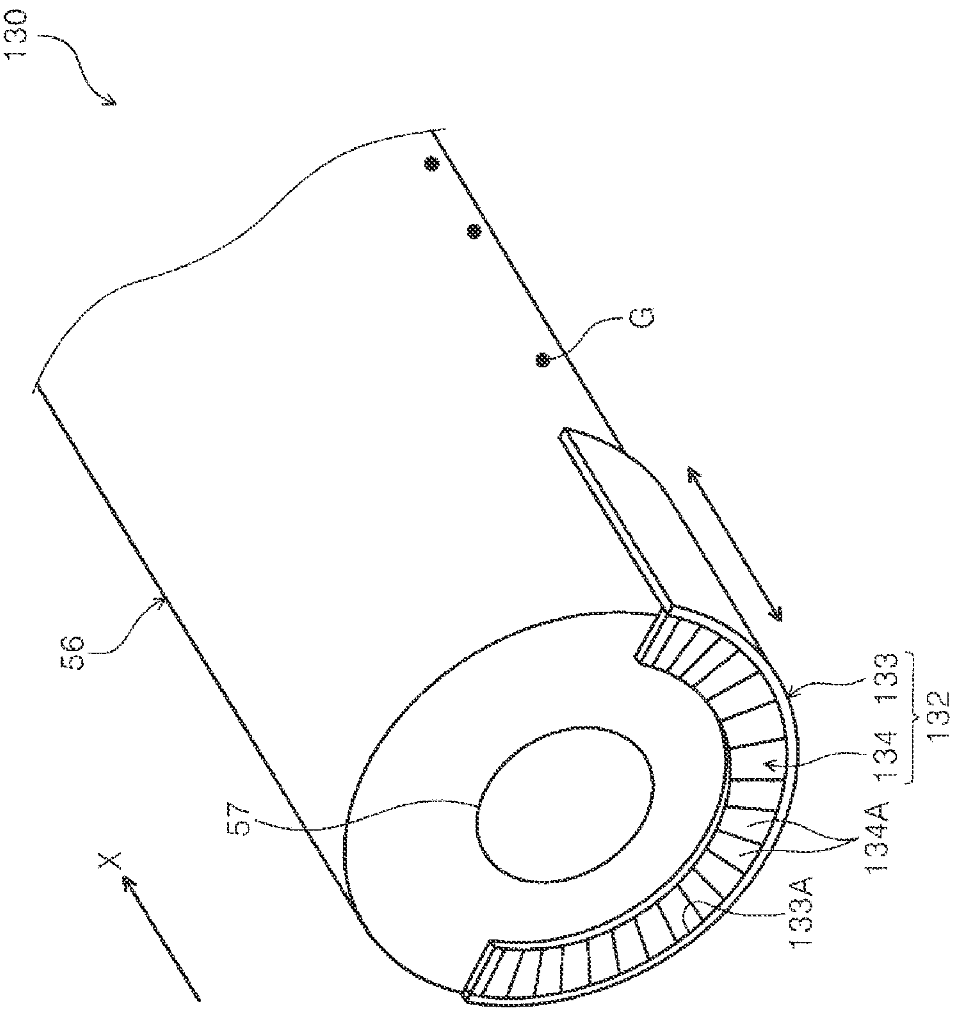
FIG. 14 is a partial perspective view of a cleaning unit according to another modification example 2.

A cleaning unit 130 may be configured, as illustrated in FIG. 14. The cleaning unit 130 has a configuration in which a cleaning brush 132 that cleans the cleaning brush 56 is added to the cleaning unit 46 (FIG. 4).

The cleaning brush 132 can be reciprocated in the X direction by a linear slider (not illustrated). The cleaning brush 132 includes a semi-cylindrical base portion 133, and a brush 134.

The base portion 133 is formed in a semicircular shape when viewed from the X direction. The base portion 133 is located on the outer side in a radial direction a portion in the −Z direction relative to a center in the Z direction in an outer periphery of the cleaning brush 56. The base portion 133 includes an inner peripheral surface 133A facing the cleaning brush 56.

The brush 134 is configured of a plurality of hair portions 134A extending toward a center of the shaft portion 57 from the inner peripheral surface 133A. A length of the brush 134 is set to a length that allows contact with the cleaning brush 56. The cleaning brush 132 is reciprocated in the X direction by the above-described linear slider as the cleaning brush 56 rotates, thereby cleaning the foreign matters G or the like adhered to the cleaning brush 56.

Another Modification Example 3

Figure 15:
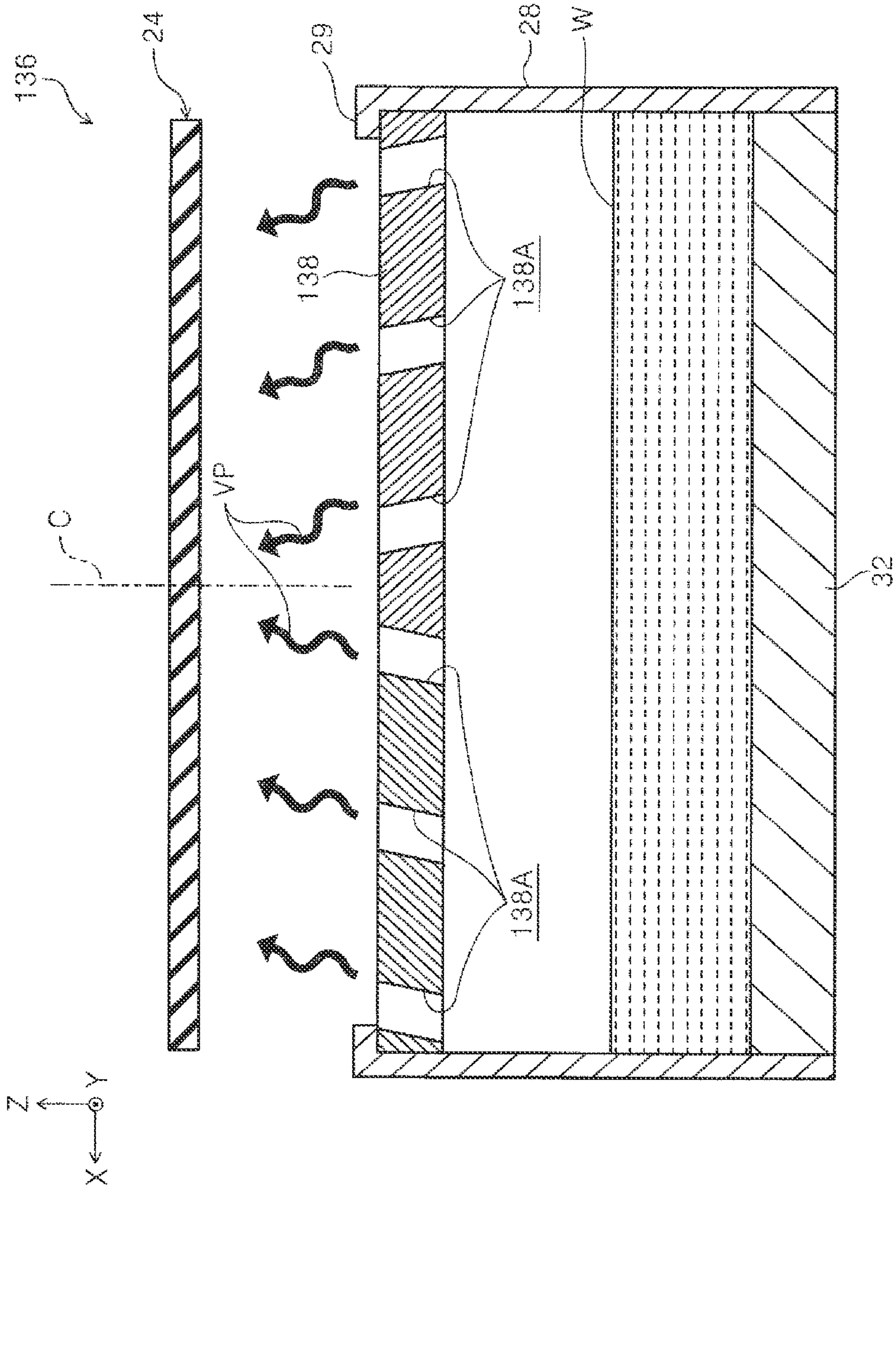
FIG. 15 is a schematic diagram of a vapor application unit according to another modification example 3.

As illustrated in FIG. 15, a vapor application unit 136 may be configured.

The vapor application unit 136 is provided with a base plate 138 instead of the base plate 34 in the vapor application unit 26 (FIG. 3). The base plate 138 is formed in a plate shape having a predetermined thickness in the Z direction. A line passing through a center in the Y direction of the glue belt 24 and extending in the Z direction is defined as a virtual line C.

The base plate 138 is located in the −Z direction with respect to the upper wall 29 inside a reservoir 28. Further, the base plate 138 is slidable in the X direction. The base plate 138 is provided with a plurality of holes 138A.

The plurality of holes 138A are provided line-symmetrically with respect to the virtual line C when viewed from the X direction. Further, the plurality of holes 138A penetrate the base plate 138 in an oblique direction crossing the Z direction to be directed to the virtual line C. A size of the hole 138A is such that the vapor VP can pass through.

Thus, the plurality of holes 138A may be configured to be directed toward the virtual line C, so that the vapor VP is aggregated toward the center of the glue belt 24.

Another Modification Example 4

Figure 16:
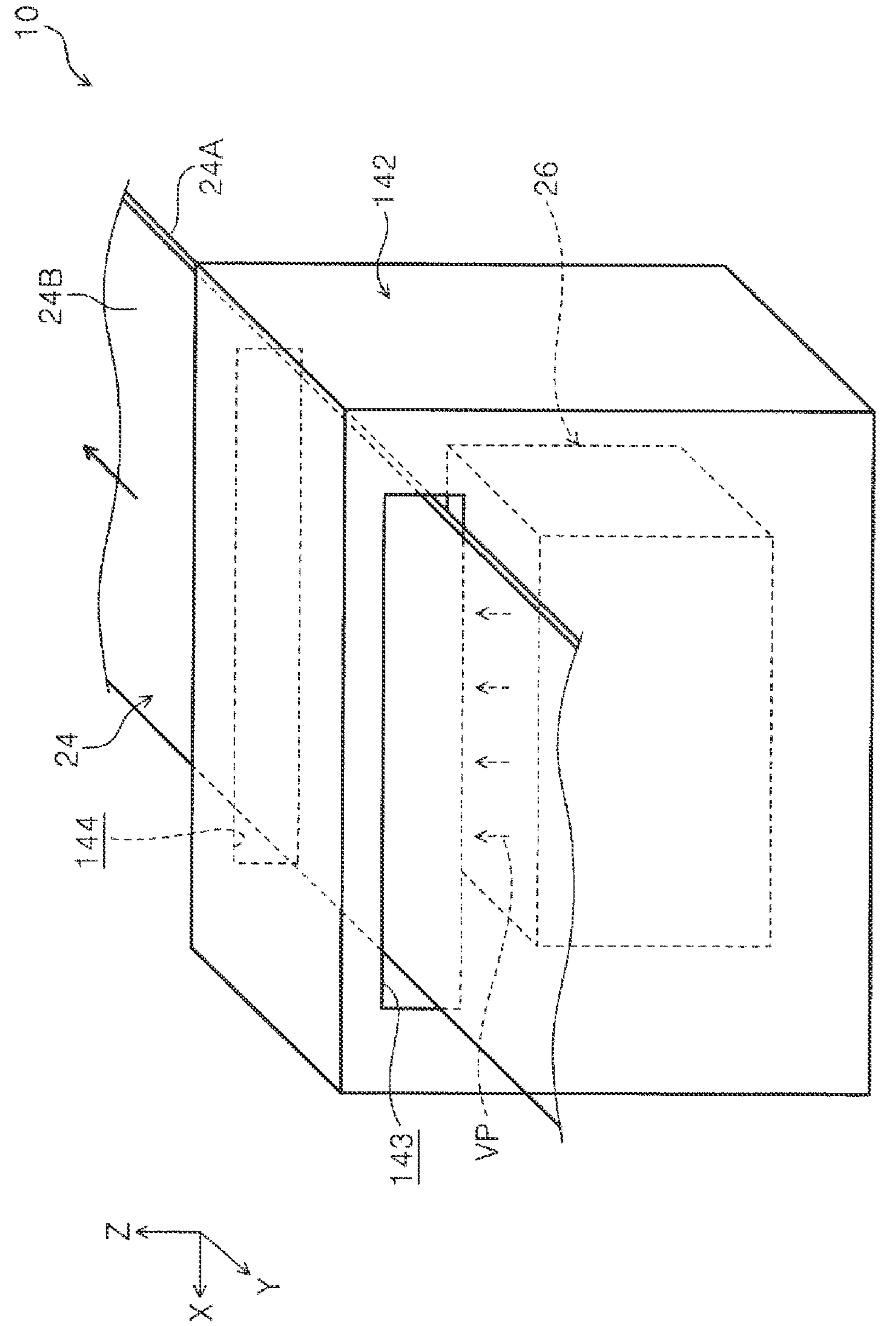
FIG. 16 is a partial perspective view of a printer according to another modification example 4.

As illustrated in FIG. 16, in the printer 10, a cover member 142 that covers a portion in a circumferential direction of the glue belt 24 and the vapor application unit 26 may be provided.

The cover member 142 is configured as a hollow rectangular parallelepiped. The cover member 142 is provided with an inlet 143 and an outlet 144 penetrating in the Y direction. The glue belt 24 enters the inside of the cover member 142 from the inlet 143 and advances to an outer side of the cover member 142 through the outlet 144.

The vapor application unit 26 is disposed inside and at a bottom of the cover member 142. The bottom of the cover member 142 is closed as an example.

Thus, the surroundings of the glue belt 24 and the vapor application unit 26 are covered with the cover member 142, so that scattering of the vapor VP can be suppressed and an amount of vapor VP applied to the glue belt 24 can be ensured.

Examples of the medium M include a film in addition to the cloth and the paper. A positioning scheme for conveying the medium M may be either a center registration scheme using a center position in the X direction as a reference or a side registration scheme using a position of one end in the X direction as a reference.

The recording unit 16 is not limited to a recording unit that performs recording in a serial scheme like the recording head 17, and may also be recording unit that performs recording in a line head scheme.

The conveying belt is not limited to the glue belt 24, and a belt using various types of adsorption force expression mechanism, such as an electrostatic adsorption scheme using an electrostatic force generated by voltage application, a vacuum suction scheme using a compressor, and an intermolecular force scheme using a plurality of minute projections, can be used.

A sponge roller may be used instead of the cleaning brush 52 as the cleaning member.

The conveying unit 20 may not include the cooling unit 44. Further, the vapor application unit 26 may be controlled, for example, so that the amount of vapor VP increases as a use time of the conveying unit 20 increases, without using the front surface detection unit 42 in the conveying unit 20. Alternatively, a configuration in which the amount of vapor VP applied from the vapor application unit 26 to the glue belt 24 is not controlled may be adopted.

The conveying unit 70 may be a conveying unit without the scraping member 78. Further, the conveying unit 70 may not include the air blowing unit 88.

The conveying unit 100 may not include the heating unit 104. Alternatively, the conveying unit 100 may include the heating unit 104 and not include the airflow generation unit 102.

A round boiler (a furnace tube boiler, a smoke tube boiler, a furnace tube smoke tube boiler, or a vertical boiler), a water tube boiler (a natural circulation water tube boiler, a forced circulation water tube boiler, or a once-through boiler), a special boiler (a cast iron boiler, a waste heat boiler, a special fuel boiler, or a special fluid boiler), or the like may be used instead of the vapor application unit 26.

The plurality of holes 34A in the vapor application unit 26 may be configured such that the opening area or the presence or absence of openings can be individually controlled.

A chemical solution for adjusting surface energy of the front surface 24A of the glue belt 24 may be applied.

A cleaning solution containing a detergent other than the water W may be applied as the vapor VP.

A member for collecting the water droplets D or the foreign matters G may be provided in the cooling unit 44.

The cleaning brush 56 may rotate in a direction opposite to the rotation direction in the above embodiments.

In the cooling unit 44, a direction in which air is blown for cooling may be a direction away from the vapor application unit 26.

In a moving direction of the glue belt 24, air may be blown toward the vapor application unit 26 and the cooling unit 44 from upstream of the vapor application unit 26.

In the maintenance mode, the moving speed of the glue belt 24 may be made lower than the moving speed in the recording mode, and the heating amount, supply amount, and generation amount of vapor VP may be made smaller than those in the recording mode to clean the glue belt 24. In this configuration, in the recording mode, the moving speed of the glue belt 24 may be made higher than that in the maintenance mode, and the heating amount, supply amount, and generation amount of vapor VP may be made larger than those in the maintenance mode to clean the glue belt 24.

What is claimed is:

1. A conveying apparatus comprising:

a plurality of rollers;

a conveying belt being coated with an adhesive on a surface and wound around the plurality of rollers, the conveying belt being configured such that a medium is attached to the surface;

a vapor application unit configured to apply heated vapor to a front surface of the conveying belt separated from the medium; and a cleaning unit configured to clean the front surface to which the vapor is applied by the vapor application unit.

2. The conveying apparatus according to claim 1, further comprising a cooling unit configured to cool at least a portion of a target region, the target region being from a first region to which the vapor is applied to a second region cleaned by the cleaning unit on the front surface.

3. The conveying apparatus according to claim 2, wherein the cooling unit cools the second region.

4. The conveying apparatus according to claim 1, further comprising:

a control unit configured to control an operation of the vapor application unit, wherein the control unit controls the operation of the vapor application unit based on a state of the front surface.

5. The conveying apparatus according to claim 1, further comprising:

a control unit configured to control an operation of the vapor application unit, wherein the control unit controls the operation of the vapor application unit based on a moving speed of the conveying belt.

6. The conveying apparatus according to claim 1, wherein the medium is a recording medium on which an image is recorded, the conveying apparatus includes a control unit configured to control an operation of the vapor application unit, and the control unit controls the operation of the vapor application unit based on a duty of the image.

7. The conveying apparatus according to claim 4, further comprising:

an airflow generation unit configured to generate an airflow toward a back surface opposite to the front surface of the conveying belt, wherein the control unit adjusts an amount of airflow generated by the airflow generation unit based on an amount of vapor generated from the vapor application unit.

8. The conveying apparatus according to claim 7, further comprising:

a heating unit configured to heat an arrival region at which the airflow arrives on the back surface, wherein the control unit controls a heating temperature of the heating unit based on the amount of airflow generated.

9. The conveying apparatus according to claim 1, wherein the cleaning unit includes:

a scraping member configured to scrape off a foreign matter adhered to the front surface while coming into contact with the front surface and a collection unit configured to collect the foreign matter scraped off by the scraping member and the scraping member includes a guide portion configured to guide the foreign matter to the collection unit.

10. The conveying apparatus according to claim 9, wherein the cleaning unit includes an air blowing unit configured to blow air toward the collection unit and air is blown to at least a portion of the scraping member between the air blowing unit and the collection unit.

11. The conveying apparatus according to claim 1, wherein the cleaning unit comprises an air nozzle configured to direct air toward a cleaning brush.

12. A printing apparatus comprising:

a conveying apparatus that includes a plurality of rollers, and a conveying belt being coated with an adhesive on a surface and wound around the plurality of rollers, the conveying belt being configured such that a medium is attached to the surface; and a recording unit configured to perform recording on the moving medium, wherein the conveying apparatus includes:

a vapor application unit configured to apply heated vapor to a front surface of the conveying belt separated from the medium and a cleaning unit configured to clean the front surface to which the vapor is applied by the vapor application unit.

13. The printing apparatus according to claim 12, wherein the cleaning unit comprises an air nozzle configured to direct air toward a cleaning brush.

* * * * *